US011891305B2

(12) United States Patent
Matyjaszewski et al.

(10) Patent No.: US 11,891,305 B2
(45) Date of Patent: Feb. 6, 2024

(54) AQUEOUS ROUTE TO NITROGEN-DOPED MESOPOROUS CARBONS

(71) Applicant: CARNEGIE MELLON UNIVERSITY, Pittsburgh, PA (US)

(72) Inventors: Krzysztof Matyjaszewski, Pittsburgh, PA (US); Jianan Zhang, Hefei (CN); Michael R. Bockstaller, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 17/959,913

(22) Filed: Oct. 4, 2022

(65) Prior Publication Data
US 2023/0049990 A1 Feb. 16, 2023

Related U.S. Application Data

(62) Division of application No. 16/559,551, filed on Sep. 3, 2019, now abandoned.

(60) Provisional application No. 62/765,636, filed on Sep. 4, 2018.

(51) Int. Cl.
C01B 32/348 (2017.01)
C01B 32/354 (2017.01)
C01B 32/21 (2017.01)
C08L 33/20 (2006.01)
C01B 32/05 (2017.01)

(52) U.S. Cl.
CPC .......... C01B 32/354 (2017.08); C01B 32/05 (2017.08); C01B 32/21 (2017.08); C01B 32/348 (2017.08); C08L 33/20 (2013.01); C01P 2006/12 (2013.01); C01P 2006/14 (2013.01); C01P 2006/17 (2013.01)

(58) Field of Classification Search
CPC ............................ C01B 32/05; C01B 32/348
See application file for complete search history.

(56) References Cited

U.S. PATENT DOCUMENTS

| 8,366,979 | B2 | 2/2013 | Dai |
| 10,614,965 | B2 | 4/2020 | Mitlin |
| 10,682,633 | B2 | 6/2020 | Pham-Huu |
| 11,000,831 | B2 | 5/2021 | Chilukuri |

OTHER PUBLICATIONS

Kopec, Maciej et al.; Aqueous RAFT Polymerization of Acrylonitrile; Macromolecules 2016, 49, 5877-5883.
Zhang, Jianan et al., Facile Aqueous Route to Nitrogen-Doped Mesoporous Carbons; J. Am. Chem. Soc. 2017; 139; 12931-12934.
Kim, Chan et al; Self-Sustained ThinWebs Consisting of Porous Carbon Nanofibers for Supercapacitors via the Electrospinning of Polyacrylonitrile Solutions Containing Zinc Chloride Adv. Mater. 2007, 19, 2341-2346.
Tang, C.; et al. Nanoporous Carbon Films from "Hairy" Polyacrylonitrile-Grafted Colloidal Silica Nanoparticles, Adv. Mater. 2008, 20, 1516-1522.
Pang, Quan et al; A Nitrogen and Sulfur Dual-Doped Carbon Derived from Polyrhodanine@Cellulose for Advanced ithium-Sulfur Batteries, Adv. Mater. 2015, 27, 6021-6028.
Liang, J. et al, Facile Oxygen Reduction on a Three-Dimensionally Ordered Macroporous Graphitic C3N4/Carbon Composite Electrocatalyst, Angew. Chem. 2012, 124, 3958-3962.
Wei, W. et al, Nitrogen-Doped Carbon Nanosheets with Size-Defined Mesopores as Highly Efficient Metal-Free Catalyst for the Oxygen Reduction Reaction, Angew. Chem. 2014, 53, 1570-1574.
Rodriguez-Reinoso, F. et al; Activated Carbons From Lignocellulosic Materials by Chemical and/or Physical Activation: An Overview, Carbon 1992, vol. 30, No. 7, 1111-1118.
Pels, J. et al; Evolution of Nitrogen Functionalities in Carbonaceous Materials During Pyrolysis, Carbon 1995, vol. 33, No. 11, 1641-1653.
Yue, Z. et al, Preparation of fibrous porous materials by chemical activation 1. ZnCl activation of polymer-coated fibers, Carbon 2002, 40, 1181-1191.
Jang, J., et al, A simple synthesis of mesoporous carbons with tunable mesopores using a colloidal template-mediated vapor deposition polymerization, Chem. Commun. 2005, 4214-4216.
Zhong, M. et al., Copolymer-templated nitrogen-enriched porous nanocarbons for CO2 capture, Chem. Commun. 2012, 48, 11516-11518.
Dutta, S. et al, From filter paper to porous carbon composite membrane oxygen reduction catalyst, Chem. Commun. 2014, 50, 11151-11153.
Lu, A. et al, Synthesis of Polyacrylonitrile-Based Ordered Mesoporous Carbon with Tunable Pore Structures, Chem. Mater. 2004, 16, 100-103.
Matyjaszewski, K et al, Atom transfer Radical Polymerization, Chem. Rev. 2001, 101, 2921-2990.
Dai, L. et al, Metal-Free Catalysts for Oxygen Reduction Reaction, Chem. Rev. 2015, 115, 4823-4892.
Zhong, M. et al, Block copolymer-templated nitrogen-enriched nanocarbons with morphology-dependent electrocatalytic activity for oxygen reduction, Chem. Sci. May 2014, 3315-3319.
Hu, C. and Dai, L. Carbon-Based Metal-Free Catalysts for Electrocatalysis beyond the ORR, Angew. Chem. Int. Ed. 2016, 55, 11736-11758.
Britovsek, G. J. P. et al, Non-heme Iron(II) Complexes Containing Tripodal Tetradentate Nitrogen Ligands and Their Application in Alkane Oxidation Catalysis, Inorganic Chemistry 2005, vol. 44, No. 22, 8125-8134.
Zhong, M. et al., Electrochemically Active Nitrogen-Enriched Nanocarbons with Well-Defined Morphology Synthesized by Pyrolysis of Self-Assembled Block Copolymer, J. Am. Chem. Soc. 2012, 134, 14846-14857.

(Continued)

Primary Examiner — Stuart L Hendrickson
(74) Attorney, Agent, or Firm — BARTONY & ASSOCIATES LLC

(57) ABSTRACT

A method for preparation of mesoporous nitrogen-doped carbon includes forming a composition by solubilizing a nitrogen-containing polymer in an aqueous solution of $ZnCl_2$ and drying the aqueous solution, the method further includes heating the composition after drying to a temperature sufficiently high to carbonize the nitrogen-containing polymer to form the mesoporous nitrogen-doped carbon.

19 Claims, 14 Drawing Sheets

(56) References Cited

OTHER PUBLICATIONS

Matyjaszewski, K. and Tsarevsky, N. V., Macromolecular Engineering by Atom Transfer Radical Polymerization, J. Am. Chem. Soc. 2014, 136, 6513-6533.

Zhang, S. et al, Polyethylenimine-Enhanced Electrocatalytic Reduction of CO2 to Formate at Nitrogen-Doped Carbon Nanomaterials, J. Am. Chem. Soc. 2014, 136, 7845-7848.

Chang, H. et al., Synthesis and characterization of mesoporous carbon for fuel cell Applications, J. Mater. Chem. 2007, 17, 3078-3088.

Wu, X. et al., Nitrogen-enriched porous carbon nanorods templated by cellulose nanocrystals as high performance supercapacitor electrodes, J. Mater. Chem. A, Mar. 2015, 23768-23777.

Kruk, M. et al., Synthesis of Mesoporous Carbons Using Ordered and Disordered Mesoporous Silica Templates and Polyacrylonitrile as Carbon Precursor, J. Phys. Chem. B 2005, 109, 9216-9225.

Yang, X. et al., Nitrogen-Enriched Nanocarbons with a 3-D Continuous Mesopore Structure from Polyacrylonitrile for Supercapacitor Application, J. Phys. Chem. C 2010, 114, 8581-8586.

Lamson, M. et al., Synthesis of Well-Defined Polyacrylonitrile by ICAR ATRP with Low Concentrations of Catalyst, J. Polym. Sci., Part A: Polym. Chem. 2016, 54, 1961-1968.

Matyjaszewski, K. et al., Synthesis of Well-Defined Polyacrylonitrile by Atom Transfer Radical Polymerization, Macromolecules 1997, 30, 6398-6400.

Xia, J. and Matyjaszewski, K., Controlled/"Living" Radical Polymerization. Atom Transfer Radical Polymerization Catalyzed by Copper(I) and Picolylamine Complexes Macromolecules 1999, 32, 2434-2437.

Matyjaszewski, K. Atom Transfer Radical Polymerization (ATRP): Current Status and Future Perspectives, Macromolecules 2012, 45, 4015-4039.

Ribelli, T. G. et al., Contribution of Photochemistry to Activator Regeneration in ATRP, Macromolecules 2014, 47, 6316-6321.

Kopeć, M. et al., Aqueous RAFT Polymerization of Acrylonitrile, Macromolecules 2016, 49, 5877-5883.

Kruk, M. et al, Partially graphitic, high-surface area mesoporous carbons from polyacrylonitrile templated by ordered and disordered mesoporous silicas Microporous and Mesoporous Mater. 2007, 102, 178-187.

Zheng, G. et al., Interconnected hollow carbon nanospheres for stable lithium metal anodes, Nat. Nanotech. 2014, vol. 9, 618-623.

Li, W. et al., Mesoporous materials for energy conversion and storage devices, Nat. Rev. Mater. 2016, 1, article No. 16023, 1-17.

Lin, T. et al., Nitrogen-doped mesoporous carbon of extraordinary capacitance for electrochemical energy storage, Science 2015, vol. 350, issue 6267, 1508-1513.

Gong, K. et al., Nitrogen-Doped Carbon Nanotube Arrays with High Electrocatalytic Activity for Oxygen Reduction, Science 2009, 323, 760-764.

Liang, C. et al., Mesoporous Carbon Materials: Synthesis and Modification, Angew. Chem. Int. Ed. 2008, 47, 3696-3717.

Shopsowitz, K. et al., Chiral Nematic Mesoporous Carbon Derived From Nanocrystalline Cellulose, Angew. Chem. Int. Ed. 2011, 50, 10991-10995.

Cao, L. and Kruk, M.; Ordered arrays of hollow carbon nanospheres and nanotubules from polyacrylonitrile grafted on ordered mesoporous silicas using atom transfer radical polymerization, Polymer 2015, 72, 356-360.

Guo, D. et al., Active sites of nitrogen-doped carbon materials for oxygen reduction reaction clarified using model catalysts, Science 2016, vol. 351, Issue 6271, 361-365.

AQUEOUS ROUTE TO NITROGEN-DOPED MESOPOROUS CARBONS

CROSS-REFERENCE TO RELATED APPLICATIONS

This application is a divisional application of U.S. patent application Ser. No. 16/559,551, filed Sep. 3, 2019, which claims benefit of U.S. Provisional patent application Ser. No. 62/765,636, filed Sep. 4, 2018, the disclosures of which are incorporated herein by reference.

GOVERNMENTAL INTEREST

This invention was made with government support under grant no. DMR 1501324 and grant no. CMMI 1663305 awarded by the National Science Foundation. The government has certain rights in this invention.

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosure of all references cited herein are incorporated by reference.

High specific surface area (SSA), high porosity, chemical inertness and thermal stability make porous carbons ubiquitous materials in numerous applications such as catalysis, water/gas purification, or energy conversion/storage. Nitrogen (N)-doped carbons have attracted particular interest, as a result of their potential as metal-free electrocatalysts (for example, for use in oxygen reduction reactions (ORR), a key process in fuel cell technology and metal-air batteries). It has been demonstrated that N-doped carbons can facilitate ORR via the four-electron pathway and provide better performance than state-of-the-art Pt/C catalysts. Such discoveries spurred extensive research to establish N-doped carbons for other applications, such as hydrogen evolution reaction (HER) and supercapacitors. The presence of high nitrogen content and interconnected mesoporosity are important characteristics for effective ORR electrocatalysis, since carbon atoms adjacent to pyridinic and graphitic quaternary nitrogen dopants enhance mass transport and provide access to active sites.

Porous carbons are usually synthesized by direct carbonization of organic precursors such as polymers or biomass using a variety of chemical or physical activation methods. Polyacrylonitrile (PAN) is an attractive precursor for N-doped carbons because of its high nitrogen content and well-established carbonization chemistry. Mesoporous carbons have been synthesized from PAN via hard-templating or soft-templating procedures. However, such an approach requires use of polar organic solvents and surface functionalization or block copolymerization which raise the costs and limit its technological impact. In that regard, high boiling point organic solvents are required to dissolve/disperse PAN and porogenic fillers, such as particles or nanofibers (for example, silica nanoparticles or nanocellulose, to enable the casting of uniform composite structures for the subsequent pyrolysis.

SUMMARY

In one aspect, a method for preparation of mesoporous nitrogen-doped carbon includes forming a composition by solubilizing a nitrogen-containing polymer in an aqueous solution of $ZnCl_2$ and drying the aqueous solution, the method further comprising heating the composition after drying to a temperature sufficiently high to carbonize the nitrogen-containing polymer to form the mesoporous nitrogen-doped carbon. Any $ZnCl_2$ remaining after drying may also be volatized upon heating the composition after drying to carbonize the nitrogen-containing polymer. In a number of embodiments, the method further includes dispersing a plurality of porogenic (solid) fillers in the aqueous solution of the composition prior to drying the composition. The porogenic fillers may, for example, include at least one of silica particles, cellulose-based nanocrystals or filter paper. In general, solid fillers such as particles used herein are removable during processing as known in the art. The composition may, for example, be formed or cast into a desired form or conformation before heating. In a number of embodiments, drying includes freeze-drying. In a number of embodiments, the nitrogen-containing polymer is polyacrylonitrile or PAN.

The composition may, for example, be stabilized by heating at a temperature below 300° C. after drying and before heating the composition to carbonize the nitrogen-containing polymer. The temperature to carbonize the nitrogen-containing polymer may, for example, be less than 850° C.

In a number of embodiments in which the nitrogen-containing polymer is polyacrylonitrile, the degree of polymerization of the polyacrylonitrile may be 100 or less. The degree of polymerization of the polyacrylonitrile may, for example, be 50 or less. The polydispersity or dispersity (mass average molar mass (or molecular weight) divided by number-average molar mass (or molecular weight); $M_w/M_n$) of the polyacrylonitrile may, for example, be less than 2.0, less than 1.5 or less than 1.3.

In a number of embodiments, the mesoporous nitrogen-doped carbon includes interconnected pores. The mesoporous nitrogen-doped carbon may, for example, have a surface area greater than or equal to $750 \text{ m}^2/\text{g}$ or greater than or equal to $1,000 \text{ m}^2/\text{g}$. A percentage of the specific surface area arising from mesopores may, for example, be at least 80% or at least 84%.

The mesoporous nitrogen-doped carbon may, for example, include both graphitic and disordered carbons. In a number of embodiments, the graphitic carbons include a catalytically active edge on pyridine oxide-N, pyrrolic- or pyridonic-N, and pyridinic-N(N—P) nitrogens.

In general, the ratio of (solid) fillers to nitrogen-containing polymer(s) (for example, PAN) may be selected to provide sufficient nitrogen-containing polymer to fill the majority of the interstitial volume between the fillers, thereby forming a coherent structure.

In another aspect, a mesoporous nitrogen-doped carbon is prepared by forming a composition by solubilizing a nitrogen-containing polymer in an aqueous solution of $ZnCl_2$, drying the aqueous solution, and heating the composition after drying the aqueous solution to carbonize the nitrogen-containing polymer to form the mesoporous nitrogen-doped carbon. A plurality of porogenic (solid) fillers may, for example, dispersed in the aqueous solution of the composition prior to drying. In a number of embodiments, the porogenic fillers includes at least one of silica particles, cellulose-based nanocrystals or filter paper. The composition may, for example, be formed cast into a desired form or conformation before heating.

As described above, the composition may, for example, be stabilized by heating at a temperature below 300° C. after drying and before heating the composition to carbonize the nitrogen-containing polymer. The temperature to carbonize the nitrogen-containing polymer may, for example, be less than 850° C.

As also described above, in a number of embodiments in which the nitrogen-containing polymer is polyacrylonitrile, the degree of polymerization of the polyacrylonitrile may be 100 or less. The degree of polymerization of the polyacrylonitrile may, for example, be 50 or less. The polydispersity or dispersity (mass average molar mass (or molecular weight) divided by number-average molar mass (or molecular weight) $M_w/M_n$) of the polyacrylonitrile is less than 2.0, less than 1.5 or less than 1.3.

In a number of embodiments, the mesoporous nitrogen-doped carbon comprises interconnected pores. The mesoporous nitrogen-doped carbon may, for example, have a surface area greater than or equal to 750 $m^2/g$ or greater than or equal to 1,000 $m^2/g$. A percentage of the specific surface area arising from mesopores may, for example, be at least 80% or at least 84%.

The mesoporous nitrogen-doped carbon may, for example, include both graphitic and disordered carbons. In a number of embodiments, the graphitic carbons include catalytically active edge on pyridine oxide-N, pyrrolic- or pyridonic-N, and pyridinic-N(N—P) nitrogens.

In a further aspect, a mesoporous nitrogen-doped carbon includes a surface area greater than or equal to 750 $m^2/g$ (or greater than or equal to 1,000 $m^2/g$) and a percentage of the specific surface area arising from mesopores of at least 84%. In a number of embodiments, the mesoporous nitrogen-doped carbon is formed via carbonization of a nitrogen-containing polymer. In a number of embodiments, the nitrogen-containing polymer is polyacrylonitrile. The mesoporous nitrogen-doped carbon may, for example, include both graphitic and disordered carbons. In a number of embodiments, the graphitic carbons include a catalytically active edge on pyridine oxide-N, pyrrolic- or pyridonic-N, and pyridinic-N(N—P) nitrogens.

The methods, systems and compositions hereof, along with the attributes and attendant advantages thereof, will best be appreciated and understood in view of the following detailed description taken in conjunction with the accompanying drawings.

DETAILED DESCRIPTION

Figure 1:
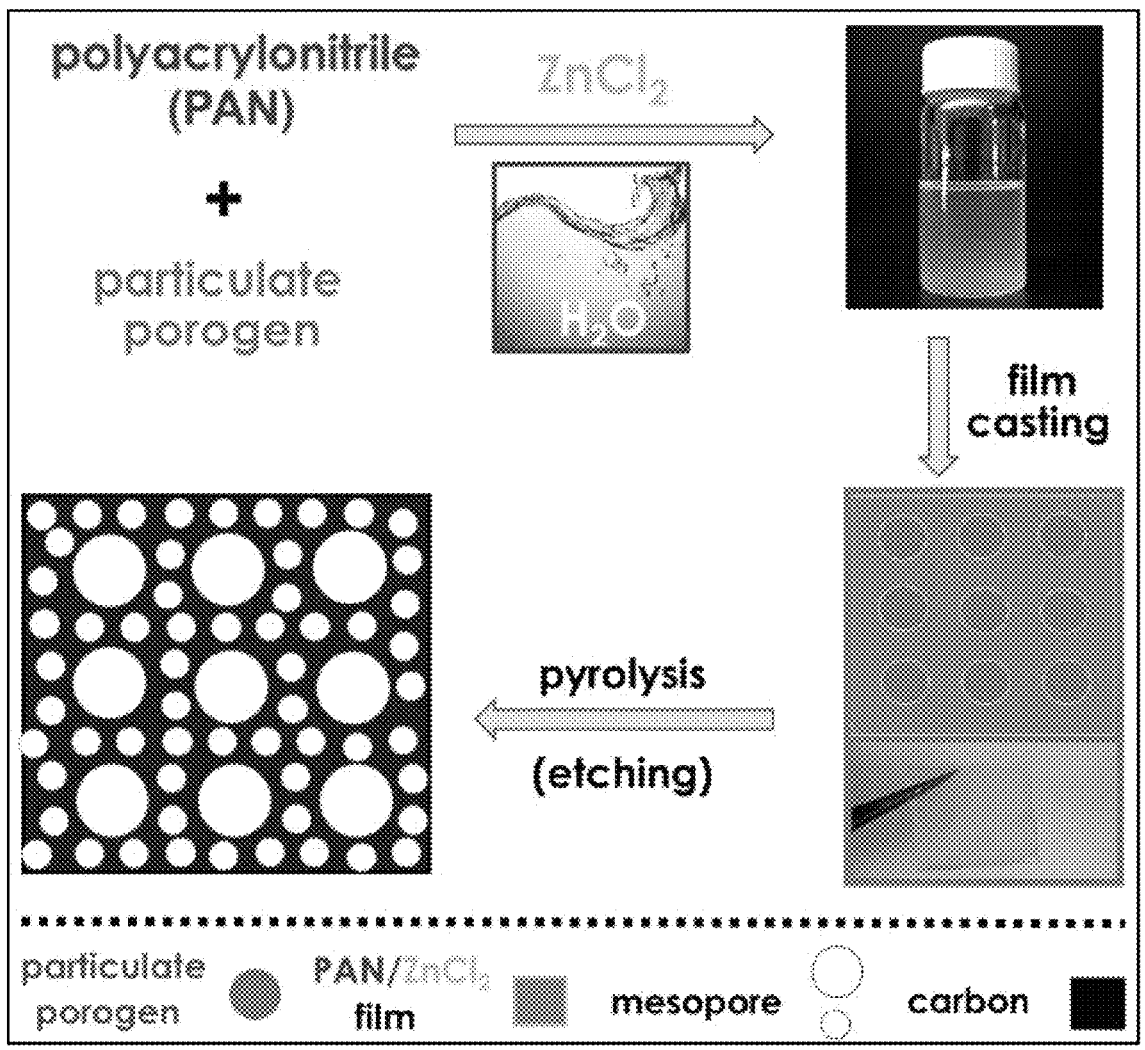
FIG. 1 illustrates an embodiment of an aqueous based procedure for the preparation of mesoporous carbons.

It will be readily understood that the components of the embodiments, as generally described and illustrated in the figures herein, may be arranged and designed in a wide variety of different configurations in addition to the described representative embodiments. Thus, the following more detailed description of the representative embodiments, as illustrated in the figures, is not intended to limit the scope of the embodiments, as claimed, but is merely illustrative of representative embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "nitrogen-containing polymer" includes a plurality of such nitrogen-containing polymers and equivalents thereof known to those skilled in the art, and so forth, and reference to "the nitrogen-containing polymer" is a reference to one or more such nitrogen-containing polymers and equivalents thereof known to those skilled in the art, and so forth. Recitation of ranges of values herein are merely intended to serve as a shorthand method of referring individually to each separate value falling within the range. Unless otherwise indicated herein, and each separate value, as well as intermediate ranges, are incorporated into the specification as if individually recited herein. All methods described herein can be performed in any suitable order unless otherwise indicated herein or otherwise clearly contraindicated by the text.

As user herein, the term "polymer" refers to a chemical compound that is made of a plurality of small molecules or monomer that are arranged in a repeating structure to form a larger molecule. Polymers may occur naturally or be formed synthetically. The use of the term "polymer" encompasses homopolymers as well as copolymers. The term "copolymer" is used herein to include any polymer having two or more different monomers. Copolymers may, for example, include alternating copolymers, periodic copolymers, statistical copolymers, random copolymers, block copolymers, graft copolymers etc.

As demonstrated in a number of representative embodiments herein the addition of $ZnCl_2$, a relatively volatile electrolyte, enables the effective co-solubilization of a nitrogen-containing polymer such a polyacrylonitrile or PAN within aqueous dispersions of porogenic fillers, such as commercial LUDOX® $SiO_2$ colloids (available from Grace of Columbia, Maryland) or nanocellulose, thereby allowing subsequent fabrication of highly porous carbons. In a number studies hereof, PAN is used as a representative example of a nitrogen-containing polymer exhibiting solubility in an aqueous $ZnCl_2$ solution. Other nitrogen-containing polymer exhibiting solubility in in an aqueous $ZnCl_2$ solution may also be used in the methods hereof.

The Lewis acid $ZnCl_2$ serves a dual role of a solubility enhancer and porogen (that is, a material used to create pores). The $ZnCl_2$ further operates with porogenic fillers to create a dual pore formation mechanism (that is, including concurrent hard templating and electrolyte evaporation) that results in the simultaneous formation of nano- and mesoporous-microstructures with significantly increased SSA as compared to regular PAN and additionally providing a N-content of 10%. As known in the art, mesoporous materials include pores with diameters between 2 and 50 nm, according to IUPAC nomenclature. Nanoporous materials generally include pores with diameters of 100 nm or less (and typically between 1-100 nm). Infiltration of cellulose filters or filter papers with aqueous $PAN/ZnCl_2$ solutions yields bulk monolithic N-doped nanocarbon films without binder components. The process is illustrated in FIG. 1.

The versatility of the aqueous route to nitrogen-doped mesoporous carbons from templated PAN solution was initially demonstrated by using a commercial aqueous suspension of $SiO_2$ nanoparticles or NPs (diameter 12.5±1.5 nm) as an exemplary model system. The PAN was dissolved in aqueous $ZnCl_2$ (60 wt %) containing $SiO_2$ NPs. Although the amount of $ZnCl_2$ in the aqueous solution may vary, in a number of representative embodiments, the mixed suspension of $ZnCl_2$, solid filler, and PAN was prepared by adding varying amounts of solid filler and PAN into aqueous 60 wt % $ZnCl_2$. For 100 g of aqueous 60 wt % $ZnCl_2$, the amount of added PAN may, for example, be in the range of 50 g to 0.5 g, 20 g to 2 g, or, in a number of embodiments, in the range of 10 g to 5 g, In a number of embodiments, the amount of solid filler added in forming a mixed suspension may, for example, be in the range 20 g to 0.2 g, 10 g to 0.5 g, or 5 g to 1 g. To ensure complete dissolution of the polymer and an operable viscosity of the $SiO_2/ZnCl_2/PAN$ suspension, PAN with a degree of polymerization (DP) of 50 ($M_n$=2700) and narrow molecular weight distribution ($M_w/M_n$<1.20) was used. PAN with a DP of 100 was less soluble and gave inferior results. Whatever nitrogen-containing polymer is used, it is desirable to control the DP to provide complete solubility and a desired viscosity for processing according to a particular used. Ranges of desirable concentration for $ZnCl_2$, nitrogen-containing polymer and filler are readily determined for a particular uses/pore characteristics as described herein.

The PAN was synthesized by initiators for continuous activator regeneration atom transfer radical polymerization (ICAR ATRP) with ppm amounts of added copper catalyst (see, for example, *J. Am. Chem. Soc.* 2014, 136, 6513; *J. Polym. Sci., Part A: Polym. Chem.* 2016, 54, 1961; *Macromolecules* 1997, 30, 6398; *Chem. Commun.* 2012, 48, 11516; *Chem. Rev.* 2001, 101, 2921; *Macromolecules* 2012, 45, 4015; *Macromolecules* 2014, 47, 6316, the disclosures of which are incorporated herein by reference) or directly in aqueous $ZnCl_2$ solution (see, for example, *Macromolecules* 2016, 49, 5877, the disclosure of which is incorporated herein by reference). Upon drying (for example, freeze drying) to remove bulk solvent from the $SiO_2/ZnCl_2/PAN$ suspensions, hybrid scaffolds were obtained. Other drying processes such as spray drying, drying under elevated temperature and drying under elevated temperature and/or vacuum may be used. Subsequent stabilization at 280° C. under air followed by carbonization at, for example, 800° C. in a $N_2$ flow and etching of the $SiO_2$ template with HE yielded mesoporous carbons. Stabilization typically includes heating at a temperature below the carbonization temperature to, for example, render the polymer thermally stable and reduce/prevent melting during the subsequent carbonization process. For example, PAN may be transformed from linear PAN to a latter structure during heating at temperature that are, for example, no greater than 300° C. for thermal stability.

Figure 2A:
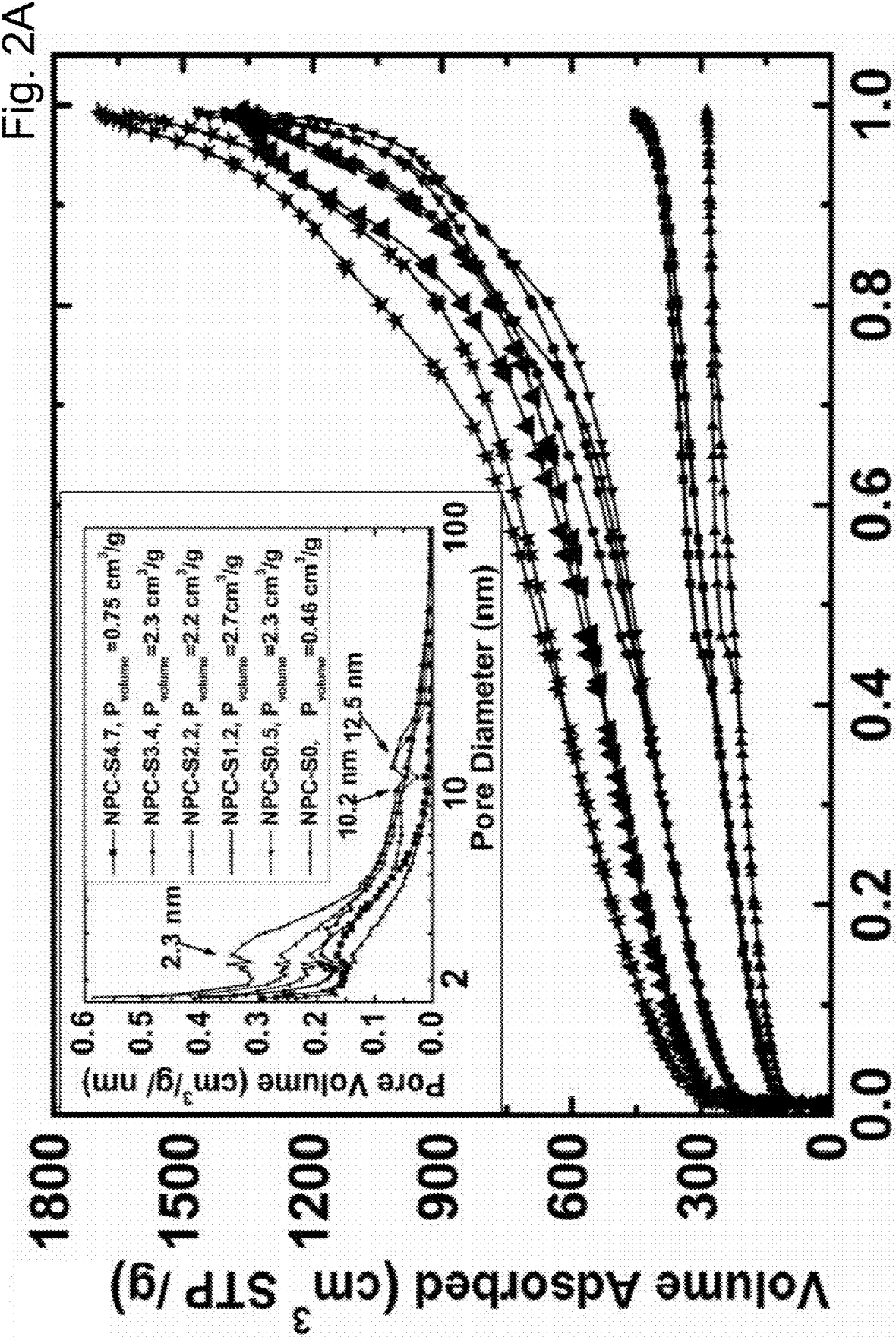
FIG. 2A illustrated $N_2$ adsorption and desorption isotherms, and the inset illustrates the pore size distribution of hierarchically nanoporous carbon prepared with different ratios of $SiO_2$/PAN.
Figure 3:
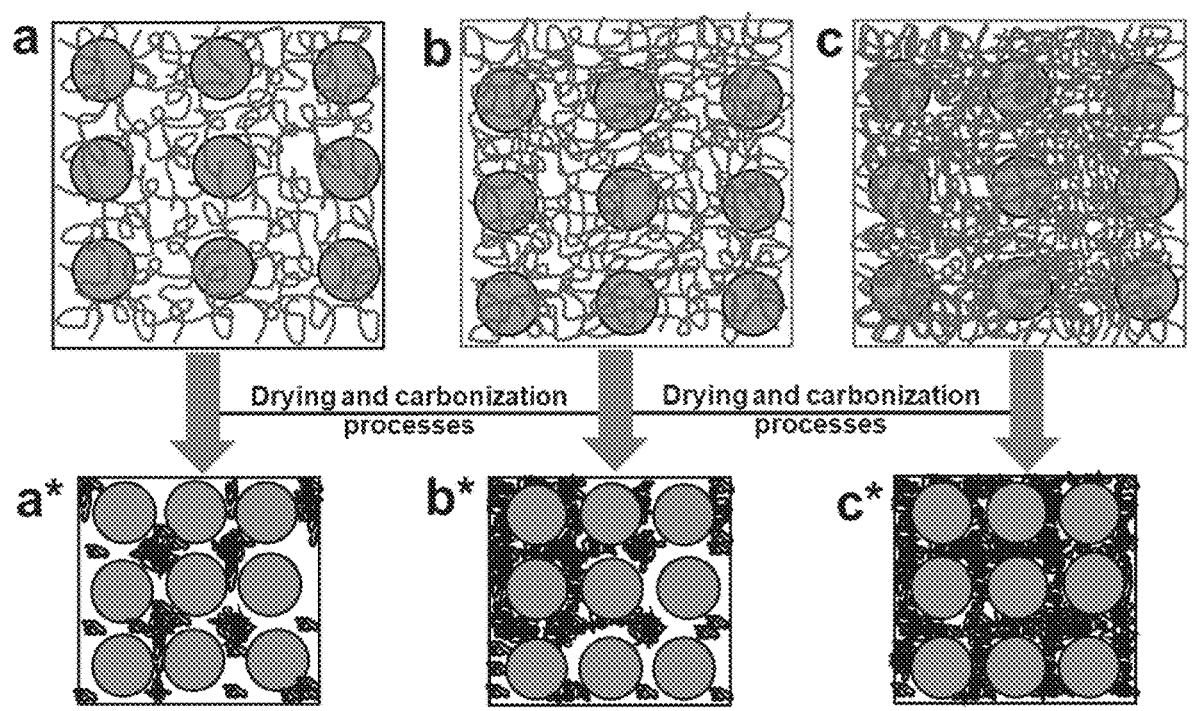
FIG. 3. Schematic illustration of the formation of nanoporous carbons with varied silica/PAN ratios (wherein gray spheres represent silica nanoparticles, lines in upper panels a, b and c represent PAN chains, and lines in lower panels a*, b* and c* represent carbon after carbonization.

FIG. 2A illustrates Brunauer-Emmet-Teller (BET) $N_2$ adsorption isotherms for carbons prepared from samples with systematically varied compositions with $SiO_2$:PAN ratios of 4.7, 3.4, 2.2, 1.2, and 0.5 (that is, with progressively higher PAN concentration; compare FIG. 3) along with a pristine sample prepared without the addition of colloidal $SiO_2$ NPs. These materials are identified as NPC-S4.7, NPC-S3.4, NPC-S2.2, NPC-S1.2, NPC-S0.5, and NPC-S0, respectively. All adsorption isotherms obtained from $SiO_2$/PAN of various ratios are type IV according to IUPAC classification and exhibit distinctive hysteresis loops at relative pressures of 0.6-0.9, indicative of filling and emptying of the mesopores by capillary condensation/evaporation. The BET surface areas ($S_{BET}$) and total pore volumes of the nanoporous carbons are listed in Table 1.

TABLE 1

SSAs and total pore volumes of the synthesized N-doped carbons.

| Samples | Ratio of silica/PAN (wt:wt) | Specific surface area (m²/g) | | | Pore volume (cm³/g) | Pore size (nm) |
|---|---|---|---|---|---|---|
| | | Micropore | Mesopore | Total | | |
| YS-PAN | Pure PAN | 128 | 63 | 191 | 0.11 | 3.6 |
| JZ-3-33CF | PAN + $ZnCl_2$ | 67 | 549 | 616 | 0.46 | 2.9 |
| JZ-3-29CF | 4.7 | 63 | 697 | 760 | 0.75 | 3.6 |
| JZ-3-28CF | 3.4 | 154 | 1065 | 1219 | 2.3 | 6.9 |
| JZ-3-30CF | 2.2 | 243 | 1262 | 1505 | 2.2 | 5.6 |
| JZ-3-32CF | 1.2 | 190 | 1586 | 1776 | 2.7 | 5.8 |
| JZ-3-37CF | 0.5 | 158 | 1062 | 1220 | 2.3 | 6.8 |

Figure 2B:
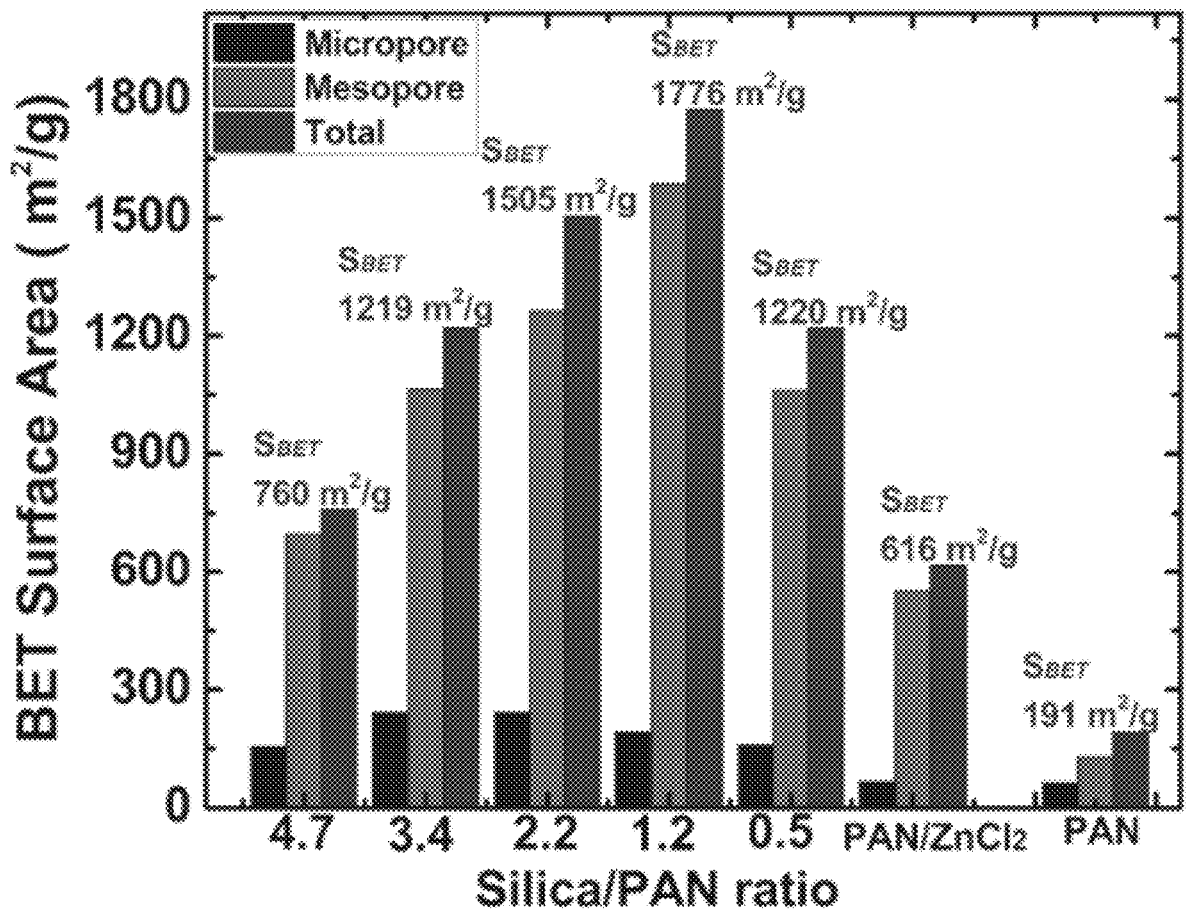
FIG. 2B illustrates contribution of different pore sizes to the total $S_{BET}$ of the prepared nanoporous carbons.

As can be seen from FIG. 2A, even the sample carbonized without the addition of $SiO_2$ exhibited significant $S_{BET}$ of 616 m²/g with large contribution from mesopores ($S_{meso}$=549 m²/g, FIG. 2b and Table 1. The corresponding pore size distribution (PSD, inset in FIG. 2A) displayed a small mesopore peak centered at 2.3 nm tailing up to ~8 nm. The high $S_{meso}$ originated from activation by $ZnCl_2$, since PAN (DP 50) carbonized without the addition of $ZnCl_2$ had a much lower $S_{BET}$=191 m²/g and no pronounced hysteresis loop in the adsorption isotherm, indicating a predominately microporous material (see FIG. 4). Interestingly, $ZnCl_2$ activation did not increase the microporosity, but selectively enhanced the $S_{meso}$ of PAN-derived carbons (see FIG. 4B and Table 1). Without limitation to any mechanism, the selective formation of mesopores, rather than micropores, that was observed in the above studies may, for example, be a result of the low molecular weight PAN matrix that is more conducive to the transport of gaseous electrolyte.

Because $ZnCl_2$ can act as a dehydrating agent, the effect of $ZnCl_2$ on thermal degradation of PAN was investigated by thermogravimetric analysis (TGA). After addition of $ZnCl_2$, the cyclization of PAN occurred at 218° C., compared to 276° C. observed in pure PAN (see FIG. 5). Thus, $ZnCl_2$ likely promoted dehydration of PAN and aromatization of nitrile groups. Furthermore, a mixture of $ZnCl_2$ and PAN decomposed at a temperature lower than pure $ZnCl_2$ and completely volatilized below 550° C., thus allowing for complete removal of the salt during pyrolysis at temperatures >600° C.

After the addition of $SiO_2$ particles to the PAN/$ZnCl_2$ solution, the $S_{BET}$ of carbons obtained utilizing the process described in FIG. 1 increased to 1220, 1776 and 1505 m²/g for samples NPC-S0.5, NPC-S1.2 and NPC-S2.2, respectively. $ZnCl_2$-induced mesopores accounted for as much as 84-90% of the total SSA (see Table 1). Without limitation to any mechanism, the remarkably high $S_{meso}$ is believed to have originated from a synergistic effect of $ZnCl_2$ activation and $SiO_2$ templating. Indeed, the mesopore peak centered at approximately 2.3 nm, similar to one observed for NPC-S0, was still visible in the PSD of all $SiO_2$-templated samples. However, the evolution of two new peaks, at 10.2 and 12.5 nm, corresponding to the size of the $SiO_2$ NPs (12.5±1.5 nm), is clearly visible, indicating efficient templating. Since a broad distribution of mesopores was observed rather than a narrow peak corresponding to 12.5 nm $SiO_2$ NPs, partial aggregation of NPs during the freeze drying and carbonization processes is possible. Further increase of the $SiO_2$/PAN ratio resulted in a decrease of $S_{BET}$ of corresponding carbons to 1219 and 760 m²/g for NPC-S3.4 and NPC-S4.7, respectively. The pores originating from $SiO_2$ NPs were no longer visible in the PSD of NPC-S4.7, very similar to that of NPC-S0 (see the inset in FIG. 2A). Without limitation to any mechanism, that observation is likely a result of an insufficient amount of PAN to efficiently encapsulate the $SiO_2$ NPs. Indeed, this hypothesis was confirmed by plotting the cumulative pore area versus average width of nanoporous carbon prepared at different $SiO_2$/PAN ratios and pure PAN (see FIG. 6). With increasing $SiO_2$/PAN ratio, the contribution of pores below 5 nm to the pore areas decreased accordingly.

Figure 7:
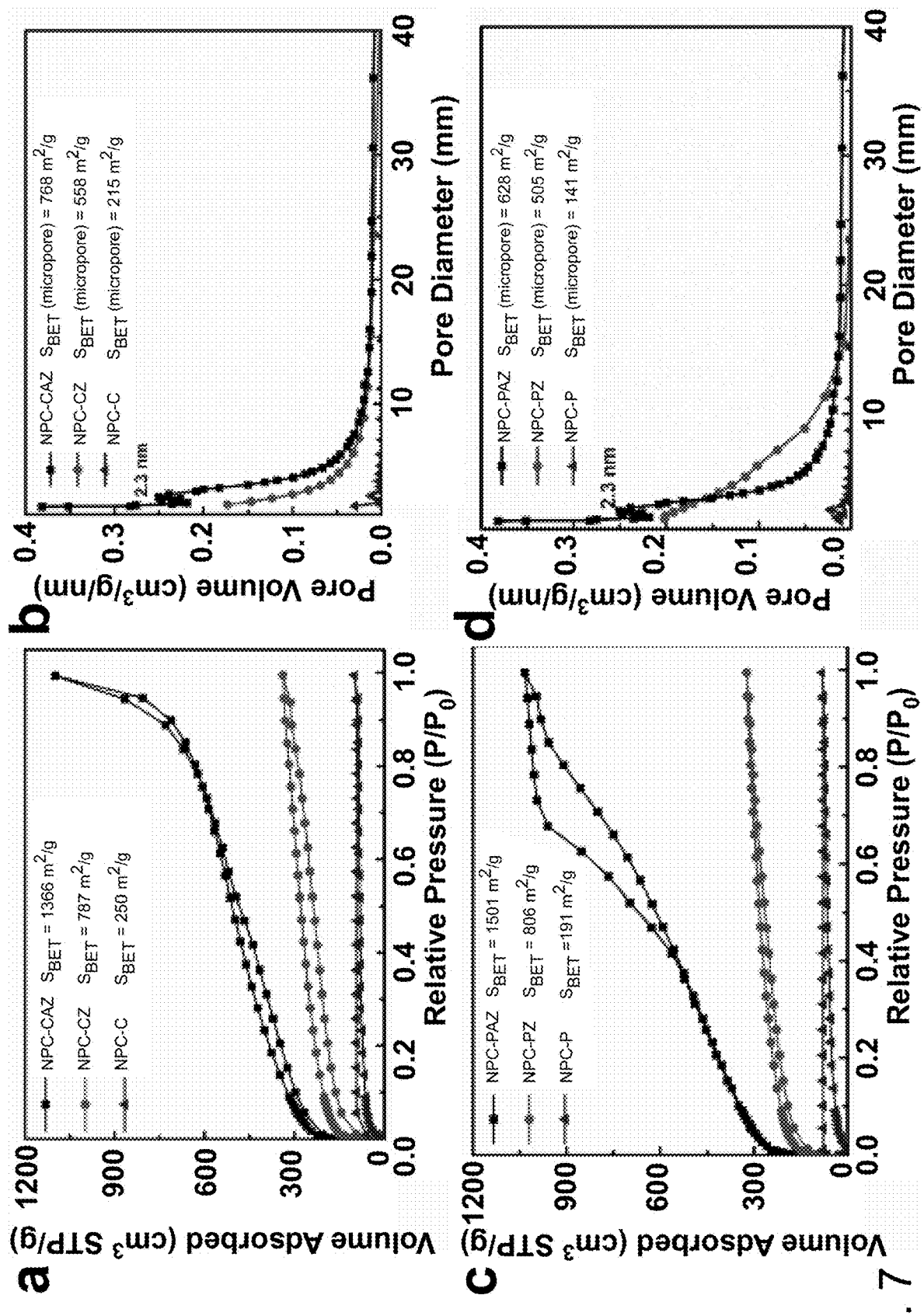
FIG. 7 illustrates $N_2$ adsorption isotherms (panels a, c) and the corresponding pore size distribution or PSD (panels b, d) of porous carbons prepared from nanocellulose (panels a, b) and cellulose filter paper (panels c, d), demonstrating a significant increase of specific surface area or SSA associated with the formation of mesopores with a diameter of approximately 2.3 nm by the volatilization of $ZnCl_2$.

To evaluate the more general applicability of the co-solubilization approach to form a benign all-organic material systems, commercial cellulose nanocrystals as well as cellulose filter paper were used as templates to prepare nanoporous carbons. FIG. 7 compares the BET $N_2$ adsorption isotherms and the corresponding PSD of porous carbons prepared from commercial cellulose nanocrystals (NPC-C) and filter paper (NPC-P) with materials obtained after infiltration with $ZnCl_2$ (NPC-CZ, NPC-PZ) and PAN/$ZnCl_2$ (NPC-PZ, NPC-PAZ), respectively.

$ZnCl_2$ activation enabled the formation of highly porous carbon with $S_{BET}$ of 1366 and 1501 m²/g for nanocellulose and filter paper templated systems, respectively. In both cases the PSD reveals the formation of mesopores with a diameter or approximately 2.3 nm that can be attributed to the volatilization of $ZnCl_2$. The size of mesopores was approximately equal for all studied template systems and the size distribution was narrower for PAN/$ZnCl_2$ infiltrated systems. Thus, the cumulative effect of $ZnCl_2$ volatilization and PAN carbonization determines the final size of mesopores. Type H3 loop characteristics was observed for both NPC-CAZ and NPC-PAZ (see FIG. 7, panels a and c). Without limitation to any mechanism, this result may, for example, be attributed to the fibrous morphology of the template that favors the formation of slit-shaped pores.

Figure 8:
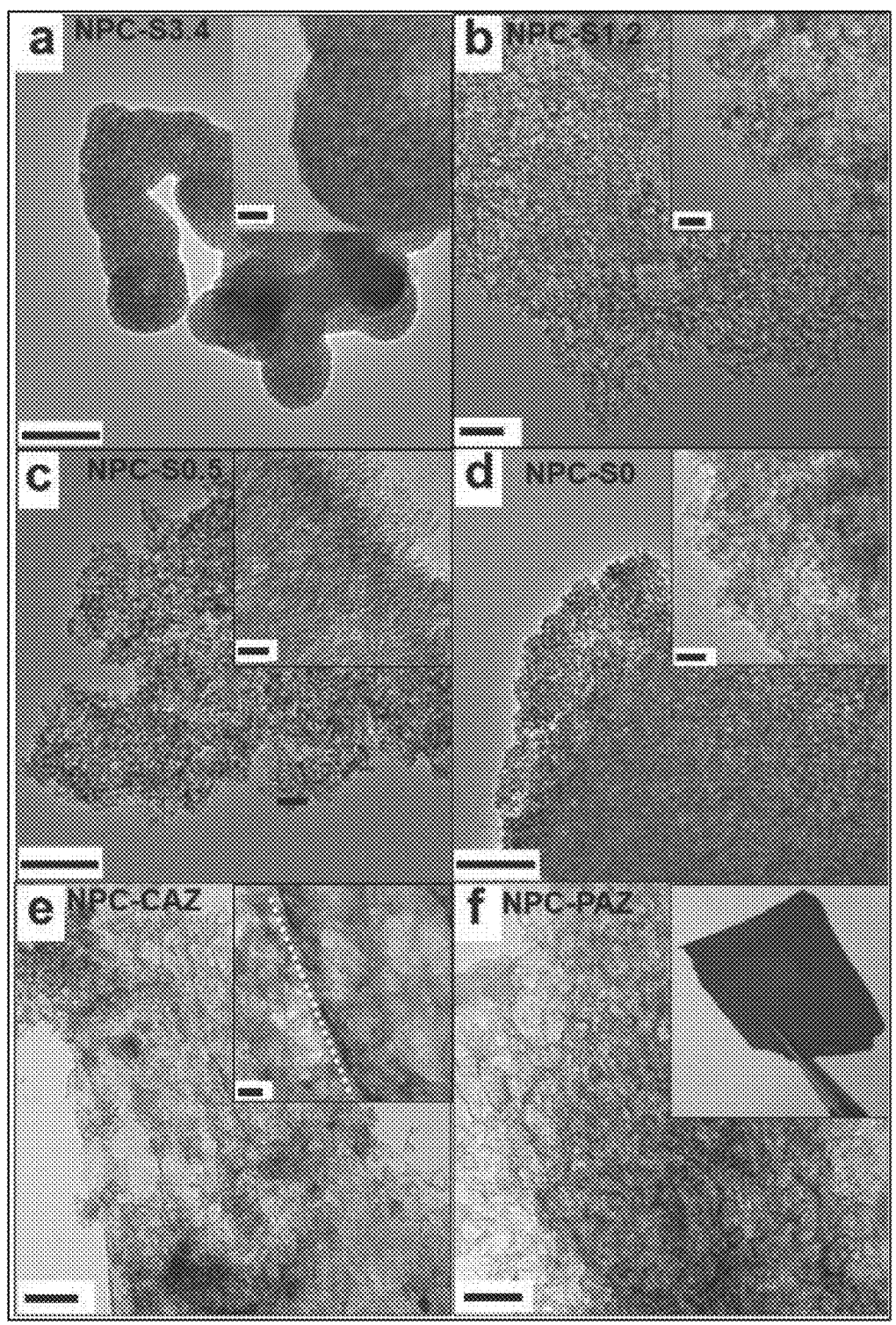
FIG. 8 Illustrates representative transmission electron microscopy or TEM images of porous carbons prepared at $SiO_2$/PAN ratios of (panel a) 3.4, (panel b) 1.2, (panel c) 0.5, and (panel d) without the addition of colloidal $SiO_2$ NPs, templated from cellulose nanocrystals (panel e) and filter paper (panel f) with filtration of PAN/$ZnCl_2$ solution, wherein the inset in panel e shows the optical picture of the corresponding porous carbon film and scale bars are 200 nm in main figures and 20 nm in insets, and the inset in panel f shows that the infiltration of PAN/$ZnCl_2$ solutions in filter paper facilitated the fabrication of monolithic NPC films.

The highly porous structure of NPCs prepared through the distinct routes discussed above are depicted in FIG. 8. The figure reveals the increase of the density of micropores with silica particle content (see panels a-d of FIG. 8), as well as the more anisotropic pore structure of cellulose derived NPCs (see panels e and f of FIG. 8).

A comprehensive comparison of the microstructures observed before and after carbonization is further shown in FIGS. 9 and 10. The infiltration of PAN/$ZnCl_2$ solutions in filter paper facilitated the fabrication of monolithic NPC films as shown in the inset of panel f FIG. 8, which benefits both the processing and integration of NPCs and enhances the advantages of NPC materials hereof.

Figure 11A:
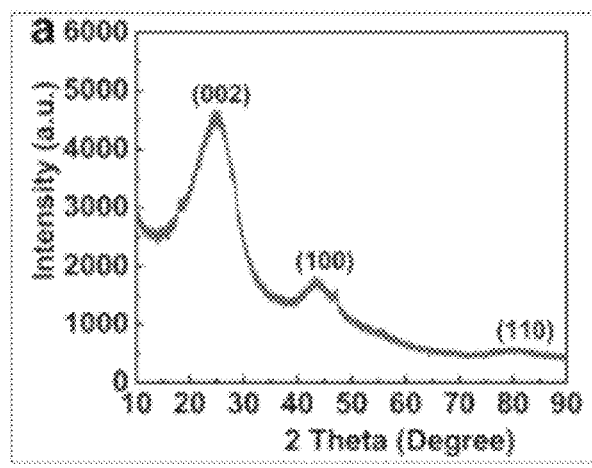
FIG. 11A illustrates X-ray diffraction or XRD profiles of an NPC-S1.2 sample.
Figure 11B:
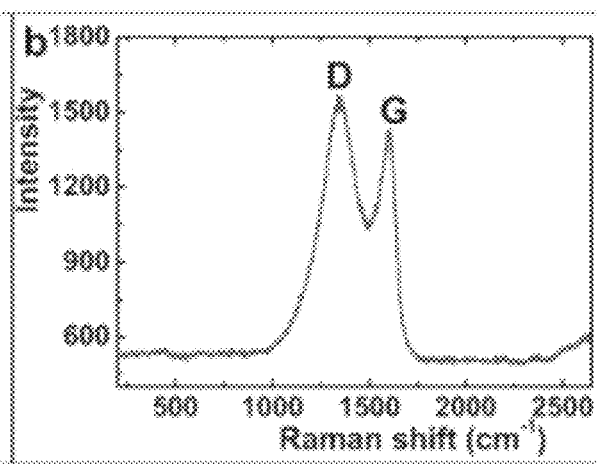
FIG. 11B illustrates Raman scattering spectrum of the NPC-S1.2 sample.

XRD pattern and Raman spectrum for nanoporous carbon demonstrate the co-existence of graphitic and disordered carbons as illustrated in FIGS. 11A and 11B. Elemental composition of the prepared mesoporous carbon (NPC-S1.2) was determined by elemental analysis (combustion method) with the nitrogen content of 10 wt %, consistent with typical values for PAN-derived carbons prepared at this temperature (800° C.).

Figure 12:
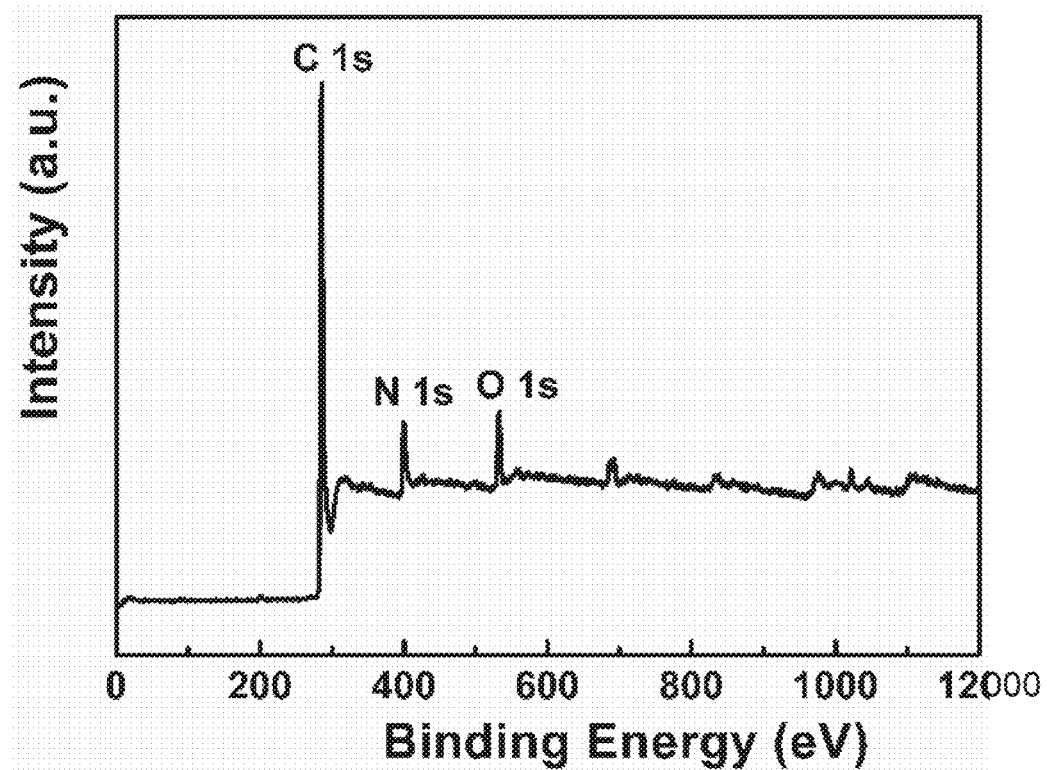
FIG. 12 illustrates an X-ray photoelectron spectroscopy or XPS survey spectrum of the NPC-S1.2 sample.

X-ray photoelectron spectroscopy (XPS) analysis was carried out to evaluate the chemical identities of the heteroatoms in the carbon network. For survey spectrum of NPC-S1.2 as illustrated in FIG. 12, three main peaks were shown including the C 1s peak at ~282-296 eV, the N 1s peak at ~395-408 eV, and the O 1s peak at ~527-540 eV, suggesting the coexistence of carbon, nitrogen and oxygen, with the respective atomic ratio of 84.0%, 9.6% and 4.9%. Similar nitrogen contents obtained from elemental analysis and XPS indicate the uniformity of nitrogen distribution in the entire carbon.

Figure 13:
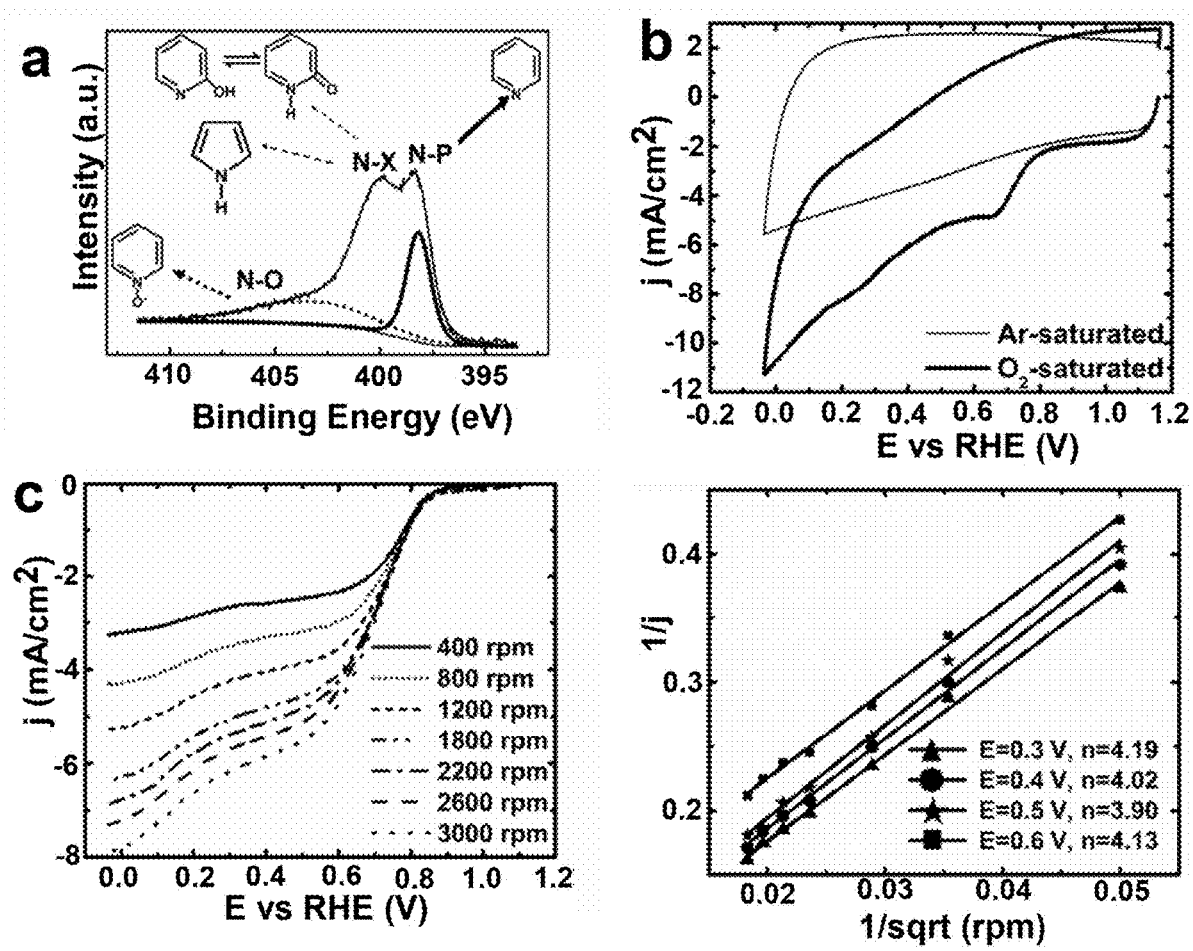
FIG. 13 illustrates: (panel a) an XPS N 1s spectrum of the NPC-S1.2 sample and electrochemical characterization of NPC-S2.2 as an electrocatalyst for ORR: (panel b) cyclic voltammetry CV curves recorded $N_2$-saturated and $O_2$-saturated 0.1 M KOH electrolyte at a scan rate 100 mV/s; (panel c) a rotating disk electrode study in $O_2$-saturated 0.1 M KOH electrolyte at a scan rate 10 mV/s; and (panel d) Koutecky-Levich analysis of the linear sweep voltammetry or LSV curves presented in panel c.

The high resolution N 1s spectrum illustrated in FIG. 13 was further deconvoluted to three peaks with the binding energies of 403.3, 399.9, and 398.2 eV, attributed to pyridine oxide-N(N—O), pyrrolic- or pyridonic-N(N—X), and pyridinic-N(N—P), respectively. The ratios of different nitrogen types are 21.7% (pyridinic-N), 56.7% (pyridonic- or pyrrolic-N) and 21.6% (pyridine oxide-N). The chemical environments of these nitrogen atoms is consistent with their location along the outer edges of nanographitic domains, which could explain their electrochemical availability. Furthermore, the full width at the half-maximum (fwhm) of the N—P peak observed was only 1.4 eV. This is significantly less than previously reported values for pyridinic nitrogen in pyrolytic carbons derived from PAN, demonstrating the high degree of uniformity of the NPCs prepared by the disclosed processes. See, for example, (*Carbon* 1995, 33, 1641.

The electrocatalytic activity of the NPC-S2.2 sample, representative of prepared carbons, was evaluated for an ORR in a standard three-electrode setup at room temperature in 0.1 M KOH as the electrolyte. The active material was deposited on a glassy carbon disk and used as the working electrode with a Ag/AgCl reference electrode and graphite counter electrode. Cyclic voltammnetry (CV) scans recorded at 100 mV/s showed no redox peak when the electrolyte was continuously purged with argon. In contrast, when the solution was saturated with $O_2$, a pronounced cathodic peak appeared in the CV scan, FIG. 13, panel b. Linear sweep voltammograms (LSV) were recorded using a rotating disk electrode (RDE) at different rotation speeds. As can be seen from the polarization curves in FIG. 13, panel c, the onset potential of NPC-52.2 based electrode was ~0.9 V vs reversible hydrogen electrode or RHE, comparable with that of commercial Pt/C catalysts. The limiting current gradually increased with rotation speed. Since ORR can proceed via either two- or four-electron transfer mechanism, Koutecky-Levich analysis was performed to determine the number of transferred electrons ($n_e$). The linear relationship between the current density ($j^{-1}$), as a function of a square root of the rotation speed ($\omega^{-1/2}$) in the potential range of 0.3-0.6 V vs RHE can be inferred from the Koutecky-Levich plots (see FIG. 13, panel d). The number of electrons ($n_e$) transferred in the process determined by the Koutecky-Levich equations ranged between 3.90 and 4.19. This result indicates that the ORR process occurred via the four-electron pathway, as expected based on the structural characteristics of this N-doped mesoporous carbon. See, for example, *Chem. Rev.* 2015, 115, 4823.

In a number of embodiments hereof, a facile, benign and scalable aqueous-based method for synthesis of mesoporous N-doped carbons is provided that that can be applied to both inorganic and all-organic templating. Application of $ZnCl_2$ as a solubility-enhancing porogen enables the solubilization of a nitrogen-containing polymer such as a relatively low molecular weight PAN and dispersion of porogenic particle fillers in water and significantly enhances the surface area as compared to regular templated systems. The resulting materials exhibited a nitrogen content of 10 wt % and showed excellent catalytic activity toward ORR via the four-electron mechanism.

The methods, compositions and systems hereof open new opportunities for timing pore size distributions in NPCs under facile and benign conditions that should promote the application of NPCs in a range of applications including, for example, metal-air batteries, fuel cells, and $CO_2$ capture.

Experimental Examples

Materials. Acrylonitrile (99.9%, available from Sigma-Aldrich of St. Louis Missouri) was passed over a column of basic alumina directly before use to remove the inhibitor. Silica particles (30 wt % silica in water, effective diameter 12.5±1.5 nm, from LUDOX, available from Grace) was used as the template. WHATMAN™ ashless filter paper (available from Sigma-Aldrich) were used as received. Cellulose nanocrystals (CNC) were kindly provided by CelluForce Company of Montreal, Canada. α,α'-Azoisobutyronitrile (AIBN, available from Sigma-Aldrich, 98%) was recrystallized from methanol. Zinc chloride (>98%, available from Sigma-Aldrich), copper(II) bromide (99.999%, available from Sigma-Aldrich), 2-bromopropionitrile (BPN, available from Sigma-Aldrich, 97%), potassium hydroxide (>99.97%, available from Fluka), dimethyl sulfoxide (DMSO, available from Fisher Scientific of Waltham, Massachusetts, 99.9%), methanol (Fisher Scientific, 99.9%) N,N-dimethylformamide (DMF) (Fisher Scientific), dimethyl sulfoxide (DMSO, Fisher Scientific, 99.9%) and hydrofluoric acid (50 vol % HF, Acros), were used as received. Milli-Q water (available from Millipore Sigma of Burlington Massachusetts) was used in all experiments. Tris(2-pyridylmethyl)amine (TPMA) was synthesized according to published procedures. See, for example, *Inorganic Chemistry* 2005, 44, 8125; *Macromolecules* 1999, 32, 2434, the disclosure of which is incorporated herein by reference.

Analytical Procedures. Characterization of polymers. The apparent molecular weights and molecular weight distributions ($M_w/M_n$) of PAN were determined by gel permeation chromatography (GPC). The GPC system used a Waters 515 HPLC pump and a Waters 2414 refractive index detector using Waters columns (STYRAGEL® $10^2$, $10^3$, $10^5$ Å) with 10 mM LiBr-containing DMF as the eluent at a flow rate of 1 mL/min at 50° C. using linear poly(ethylene oxide) (PEO) standards. Exact DP values were determined by $^1$H NMR spectroscopy measurements performed on a Bruker Avance 300 MHz spectrometer. Thermogravimetric analysis (TGA) was performed on a TA Instruments Q50 with 60 mL/min flow rate of air or nitrogen.

Characterization of the nanocarbons. Brunauer-Emmet-Taller (BET) specific surface area measurements were carried out using a Micromeritics Gemini VII 2390 Surface Area Analyzer with VacPrep 061 degasser. Carbon samples were degassed at 300° C. and 20 mTorr vacuum for at least 8 hours prior to measurement. The adsorption isotherms were fitted to the Barrett-Joyner-Halenda (BJH) model with the Kruk-Jaroniec-Sayari (KJS) correction to yield pore-size distributions. The surface area of micropores was estimated using the t-plot method with the KJS thickness correction. The micropore surface area ($S_{micro}$) was obtained from a t-plot method using the de Bore equation. The mesopore surface area ($S_{meso}$) is simply calculated from the value of $S_{BET}$-$S_{micro}$. The mesopore size distribution was obtained from Barett-Joyner-Halenda (BJH) method from the desorption branch. Transmission electron microscopy (TEM) (HT-7700, Hitachi Ltd. Tokyo, Japan) was conducted at an accelerating voltage of 120 kV. X-ray diffraction (XRD) patterns were recorded on a Rigaku Geigerflex equipped with a theta/theta goniometer. The Raman spectra were collected on a Jobin Yvon T64000 triple Raman system (ISA, Edison, NJ) in a subtractive mode with microprobe sampling optics. The excitation was at 514.5 nm (Art laser, Model 95, Lexel Laser, Fremont, CA). XPS was performed using an ESCALAB 250Xi X-ray Photoelectron Spectrometer Microprobe, with a 900 mm spot size. Inductively coupled plasma mass spectrometry (ICP-MS) was carried out using an Agilent 7700×ICP-MS under high energy helium flow.

Electrochemistry. A glassy carbon (GC) electrode (5 mm, from Gamry) was carefully polished with 3 μm, 1 μm, and 0.25 μm diamond successively to obtain a mirror-like surface. Then the electrode was washed with double-distilled water and acetone and finally dried in air. Five milligrams of carbon were dispersed in 1 mL of a solvent mixture of NAFION® (5%; an ionomeric polymer or ionomer available from Chemours Company of Wilmington, Delaware) and ethanol (1/9, v/v) by sonication for 1 h. Twenty microliters of the solution were drop cast on the GC electrode surface and dried in air to obtain the catalyst loading of 0.5 mg/cm$^2$. Voltammograms were recorded at 25° C. with a Gamry Reference 600 potentiostat. Measurements were carried out at a scan rate of 10 mV/s or 100 mV/s using the nanocarbon-modified GC disk as working electrode and a graphite rod counter electrode in Ar-saturated or $O_2$-saturated 0.1 M aqueous KOH electrolyte. Potentials were recorded versus a Ag/AgCl reference electrode. All potentials were converted to reversible hydrogen electrode (RHE) according to the equation: E (RHE)=$E^0$ (Ag/AgCl)+E (Ag/AgCl)+0.0059×pH.

Kinetics of the ORR process was followed by Koutecky-Levich analysis of linear sweep voltammograms using Koutecky-Levich equations:

$$\frac{1}{j} = \frac{1}{j_L} + \frac{1}{j_K} = \frac{1}{B\omega^{1/2}} + \frac{1}{j_K}$$

$$B = 0.62 n_e F C_0 D_0^{2/3} \nu^{-1/6}$$

$$j_K = n_e F k C_0$$

where j (mA/cm$^2$) is the measured current density, $j_K$ and $j_L$ (mA/cm$^2$) are the kinetic- and diffusion-limiting current densities, tο is the angular velocity of the rotating disk ($\omega=2\pi N$, where N is the linear rotating speed in rpm), $n_e$ is the overall number of electrons transferred in ORR, F is the Faraday constant (96485 C/mol), $C_0$ is the bulk concentration of $O_2$ (1.2×10$^{-3}$ mol/L), $D_0$ is diffusion coefficient of $O_2$ (1.9×10$^{-5}$ cm$^2$/s), ν is the kinematic viscosity of the electrolyte (0.01 cm$^2$/s), and k is the electron transfer rate constant, respectively. The number of electrons transferred ($n_e$) and the kinetic-limiting current $j_K$ can be obtained from the slope and intercept of the Koutecky-Levich plots (1/J versus $\omega^{-1/2}$, FIG. 4d), respectively.

Morphology of LUDOX silica nanoparticles TEM images of LUDOX SM-30 silica nanoparticles at different magnitudes were examined and showed a narrow size distribution and the diameter of about 12.5 nm. The average diameter of silica nanoparticles was determined by ImageJ analysis software from the TEM images. The size of LUDOX SM-30 was 12.5±1.5 nm.

XRD pattern and Raman Spectrum characterization. XRD patterns for the nanoporous carbon observed at 2θ of 25°, 450, and 80° can be identified as (002), (100), and (110) reflections of partially nanographitic structures (see FIGS. 11A and 11B). *J. Am. Chem. Soc.* 2014, 136, 7845; *Angew. Chen. Int. Ed.* 2016; *Nat. Nanotech.* 2014, 9, 618, the disclosures of which are incorporated herein by reference. The lateral size of partially graphitic domains can be estimated based on the width of the (100) peak (using Debye-Scherrer equation) and indicates pore sizes ≤3 nm. The (002) diffraction peak centered at a 2θ~25° reveals that π-stacking of nanographitic platelets did not exceed more than two to three π-stacked nanographene sheets. The Raman spectrum shows peaks at 1360 and 1586 cm$^{-1}$, correspond to the characteristic D and G bands of graphitic carbons, respectively (see FIG. 11B). As the G band is related to tangential vibrations of sp$^2$ carbon atoms, its presence in the spectra suggests the existence of graphitic structures in the nanoporous carbon materials. On the other hand, the D band corresponds to the defect band. By measuring the ratio of intensities of the two bands (i.e., $I_D/I_G$), the relative degree of order/disorder in the nanoporous carbon was 1.07, suggesting the co-existence of graphitic and disordered carbons.

EXAMPLE 1. Synthesis of low molecular weight PAN. PAN samples were synthesized by initiators for continuous activator regeneration atom transfer radical polymerization (ICAR ATRP) following a recently published procedure. *J Polym. Sci., Part A: Polym. Chem.* 2016, 54, 1961, the disclosure of which is incorporated herein by reference. To prepare PAN with degree of polymerization (DP)=50; 37.8 mg of AIBN (0.23 mmol, 0.1 equiv.), 18.75 mL of DMSO and 1.85 ml of DMF (as NMR internal standard) were charged added to a Schlenk flask and degassed for 30 minutes. A stock solution of $CuBr_2$ and TPMA in DMF was prepared and degassed for 30 min, so that 2.58 mg (0.011 mmol, 0.005 equiv.) of $CuBr_2$, 10.03 mg (0.034 mmol, 0.03 equiv.) of TPMA could be added to the Schlenk flask. 12.22 g (0.23 mol, 100 equiv.) of degassed AN was added to the flask, and finally, 308 mg (2.30 mmol, 1 equiv.) of BPN was added and the polymerization was started by immersing the flask in an oil bath at 65° C. and conducted over 6.5 h. The reaction was stopped at a monomer conversion of 49.6% (determined by $^1$H NMR). The PAN was isolated by precipitation into methanol/water (4:1, v/v) and dried under vacuum at room temperature overnight. The DP of the obtained polymer was confirmed by $^1$H NMR to be 49.

1A) Effect of PAN molecular weight on the formation of a stable composite solution. PANs with two different DPs were used to fill the interstitial voids of silica nanoparticles.

PAN/ZnCl$_2$ solution of DP 100 and DP 50 were prepared and added to LUDOX SM-30 silica nanoparticles. The PAN sample with a DP 100 could not be completely dissolved in the aqueous solvent and formed an opaque solution with a relatively high viscosity. The PAN sample with a DP 50 formed a transparent solution, indicating that PAN with a lower DP can be completely dissolved in the aqueous ZnCl$_2$ solution. In general, PANs having a DP of 100 or less are suitable for use herein.

Figure 4A:
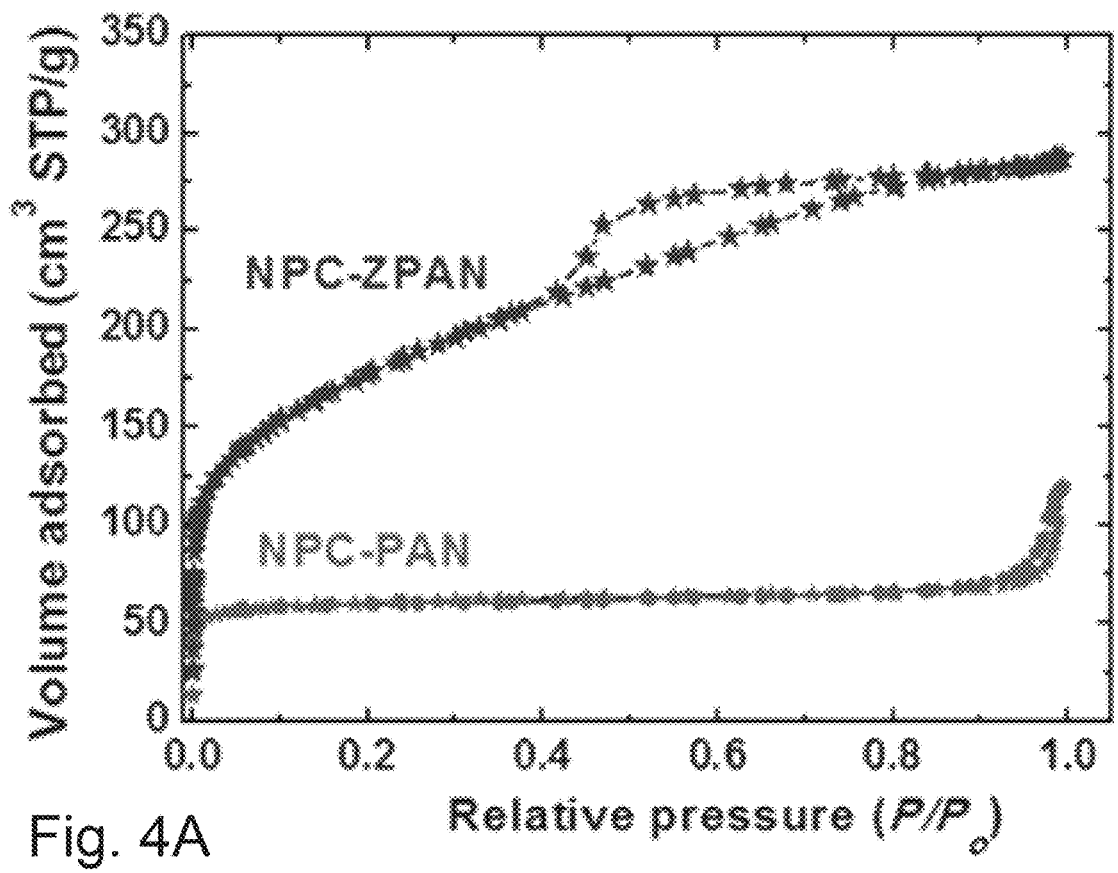
FIG. 4A illustrates $N_2$ adsorption and desorption isotherms
Figure 4B:
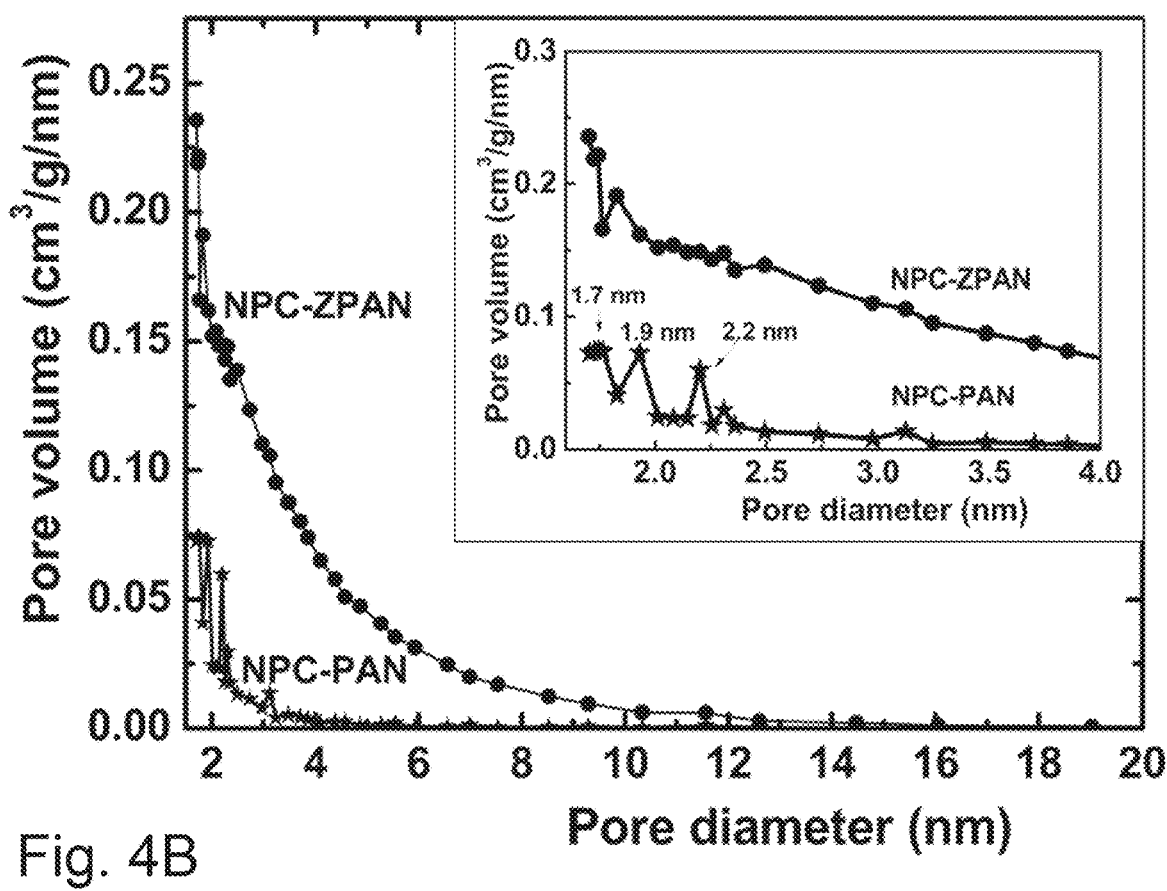
FIG. 4B illustrates pore size distributions of nanoporous carbons obtained from pure PAN (NPC-PAN) and $ZnCl_2$ activated PAN (NPC-ZPAN), wherein an enlarged portion of pore size distributions is shown in the inset to provide further detailed information.

1B) Effect of addition of ZnCl$_2$ on S$_{BET}$ of carbons formed from low-MW PAN. To elucidate the effect of ZnCl$_2$ activation on the development of pores, pure PAN and ZnCl$_2$ activated PAN with DP~50 were carbonized. The resulting carbons were termed NPC-PAN and NPC-ZPAN, respectively. The N$_2$ adsorption isotherms recorded for NPC-PAN and NPC-ZPAN are type I and type IV, respectively. Both exhibit a steep increase at low relative pressure indicating the presence of micropores, however, the carbons exhibited different hysteresis loops at relative pressures of 0.6-0.9 (see FIG. 4A). The carbon obtained from pure PAN showed a typical characteristic of a microporous material while the shape of the isotherms of ZnCl$_2$ activated PAN indicated the existence of both micropores and mesopores (FIG. 4A). This conclusion is supported by the pore size distribution analysis which showed a long tailing up to 9-10 nm in the case of NPC-ZPAN and mostly micropores for NPC-PAN.

Figure 5A:
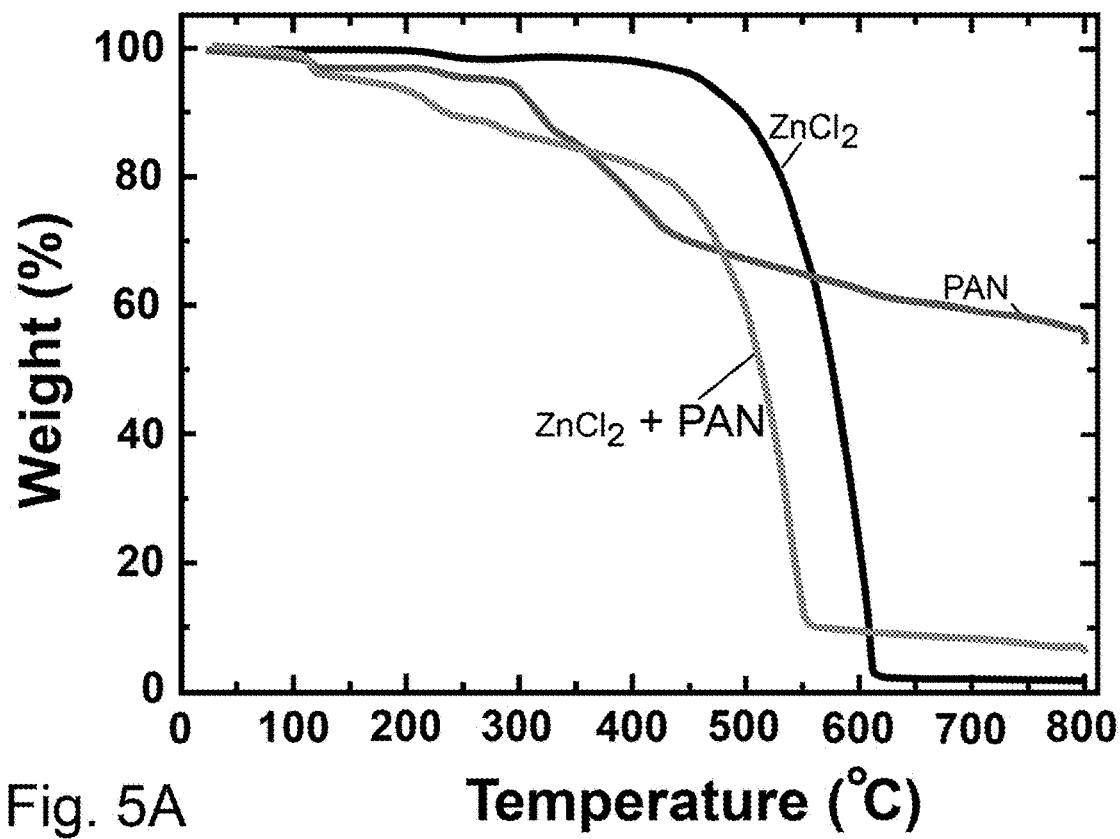
FIG. 5A illustrates the result of thermogravometric analysis or TGA of $ZnCl_2$, a mixture of PAN with $ZnCl_2$, and PAN measured under $N_2$ atmosphere at a heating rate of 10° C./min.
Figure 5B:
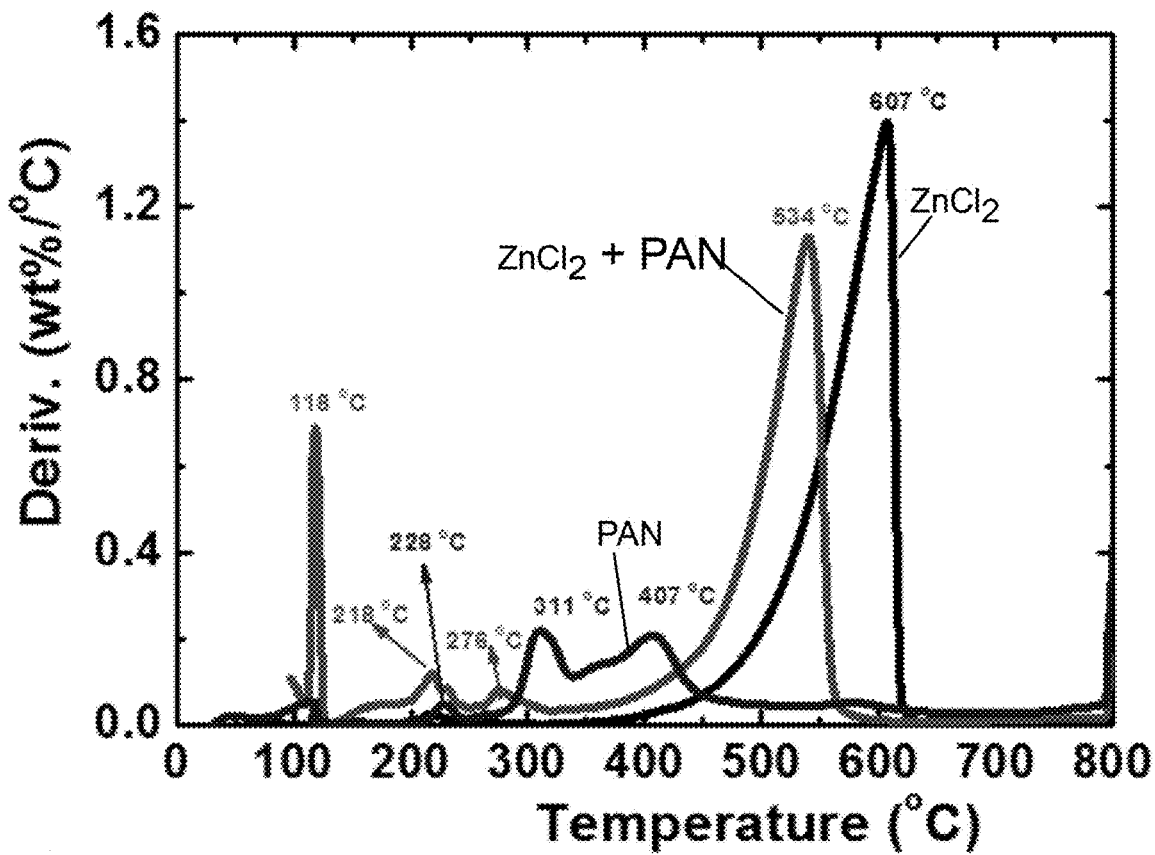
FIG. 5B illustrates derivative thermogravimetry or DTG analysis of $ZnCl_2$, a mixture of PAN with $ZnCl_2$, and PAN measured under $N_2$ atmosphere at a heating rate of 10° C./min.

1C) Effect of ZnCl$_2$ addition on the thermal behavior of PAN. The effect of the ZnCl$_2$ addition on the thermal behavior of PAN was studied by TGA using a heating rate of 10° C./min in N$_2$. FIGS. 5A and B shows TGA results of ZnCl$_2$, PAN, and a mixture of PAN with ZnCl$_2$ (a solution of 0.4 g of PAN and 13.5 g of ZnCl$_2$). The PAN and ZnCl$_2$ blend samples were freeze dried before TGA analysis. The weight loss of pure ZnCl$_2$ started at about 400° C., had a maximum weight loss rate at 607° C. at a heating rate of 10° C./min in N$_2$, and all the ZnCl$_2$ decomposed before reaching 617° C. A typical TGA curve for pure PAN displayed peaks at 228° C. and 311° C. corresponding to the cyclization of nitrile groups. Further carbonization of the crosslinked PAN occurred with slight weight loss between 400 and 800° C. A total mass loss of ~50% was recorded, in line with the well-known PAN carbonization mechanism. However, three main peaks were observed at 218, 276, and 534° C., for the mixture of PAN and ZnCl$_2$. The cyclization of PAN occurred at 218° C., which was lower than that observed in the pure PAN system. ZnCl$_2$ is generally believed to function as a dehydrating agent, eliminating water and inducing the aromatization of carbon which suggests that the incorporated zinc chloride accelerated the oxidative stabilization reactions and promoted the dehydration reactions of the PAN at lower temperatures, which results in aromatization of the carbon skeleton with the concomitant generation of a pore structure.

Furthermore, the ZnCl$_2$ present inside the PAN volatilized out of the composites at a lower temperature compared with that measured for pure ZnCl$_2$. The removal/volatilization of ZnCl$_2$ from the composite occurred at a lower temperature and the maximum weight loss rate shifted to 534° C., leading to the nearly complete volatilization of ZnCl$_2$. This suggested that nearly zero amounts of ZnCl$_2$ remain entrapped after pyrolysis at the high carbonization temperature.

EXAMPLE 2. Preparation of N-doped mesoporous carbon from colloidal silica-templated PAN. The aqueous suspension of colloidal silica was dialyzed against water to about 10 wt %. In a typical synthesis, different ratios of PAN and ZnCl$_2$ were added to 10 mL of an aqueous colloidal silica, and the concentration of ZnCl$_2$ in the aqueous solution was adjusted to 60 wt % to ensure complete solubility of the PAN. The mixture was stirred for 1 h at room temperature until a transparent solution was formed. Then, the silica/PAN solution was subjected to freeze-drying to yield a solid silica/PAN composite. The composite was then stabilized under air at 280° C. followed by carbonization at 800° C. for 30 min under nitrogen to yield a silica-carbon composite. The obtained carbon samples were then stirred in 50 wt % aqueous HF solution for 12 h to remove the silica template.

1B) Preparation of nanoporous carbons with varied silica/PAN ratios (wt:wt). FIG. 3 shows a schematic illustration of the effect of silica/PAN ratio on the formation of nanoporous carbons. After the addition of silica to the PAN/ZnCl$_2$ solution, the S$_{BET}$ of nanoporous carbons increased greatly. When the silica/PAN ratio was high, 4.7, incomplete encapsulation and/or aggregation of silica NPs occurred during the freeze-drying and carbonization processes (FIG. 3, panel a) and thus silica NPs contributed little to the total SSA of the resulting nanoporous carbon after the etching process (FIG. 3, panel a*). However, a further decrease of the silica/PAN ratio (FIG. 3, panel b) part of silica NPs were encapsulated by PAN chains leading to the increase of S$_{BET}$ of corresponding carbons (FIG. 3, panel b*). The pores originating from silica became visible in PSD of NPC-S3.4 as a result of sufficient encapsulation of silica NPs by PAN. At a higher volume fraction PAN (FIG. 3, panel c), more and more silica NPs started to be encapsulated. Consequently, the silica NPs had a higher contribution to the total SSA of nanoporous carbon demonstrating the significant effect of efficient silica templating (FIG. 3, panel c*).

Figure 6:
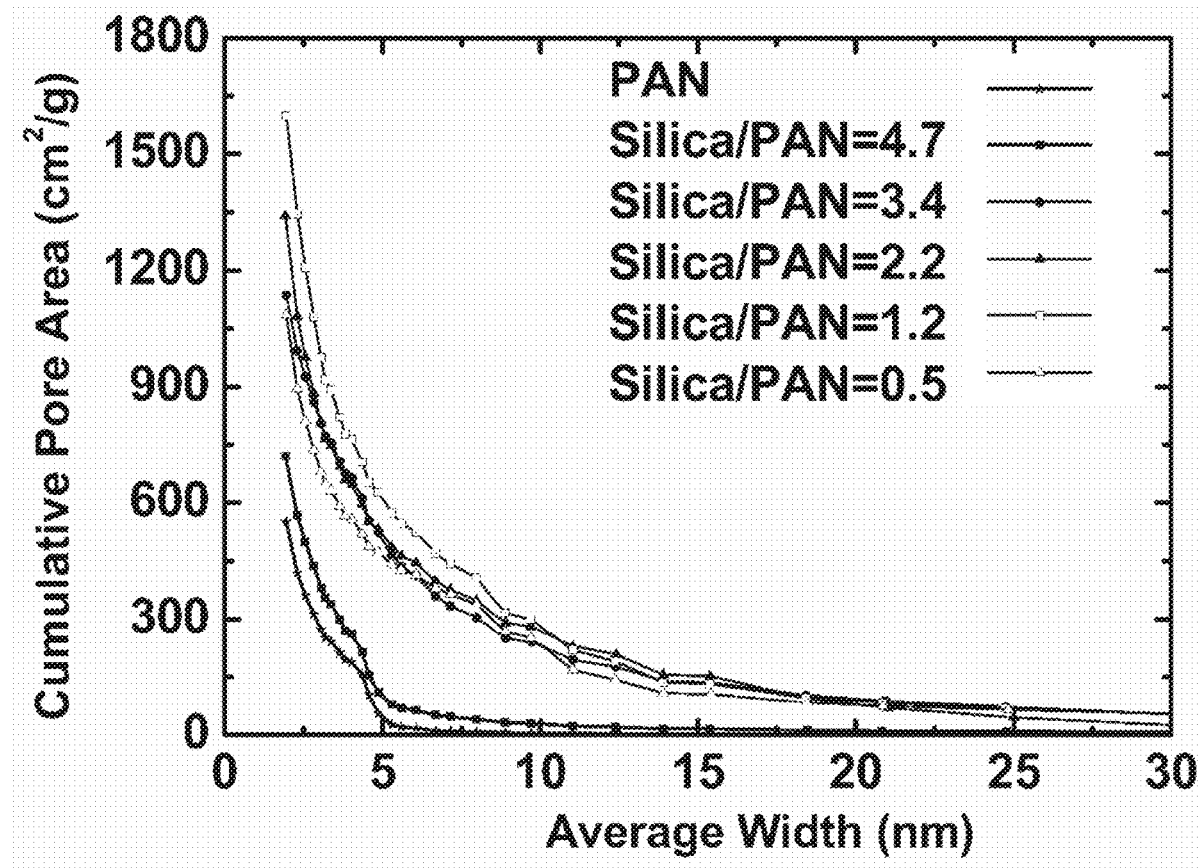
FIG. 6 illustrates cumulative pore area versus average width of nanoporous carbons prepared at different silica/PAN ratios.

2C) Contributions of various pores to S$_{BET}$. The cumulative pore area versus average width of nanoporous carbon prepared at different silica/PAN ratios and pure PAN are shown in FIG. 6. With increasing silica/PAN ratios, the contribution of 4.5 nm pores to the pore areas decreased accordingly and the contribution of mesopores in the range of 5-20 nm to the pore areas increased gradually as the silica/PAN ratio decreased.

Figure 9A:
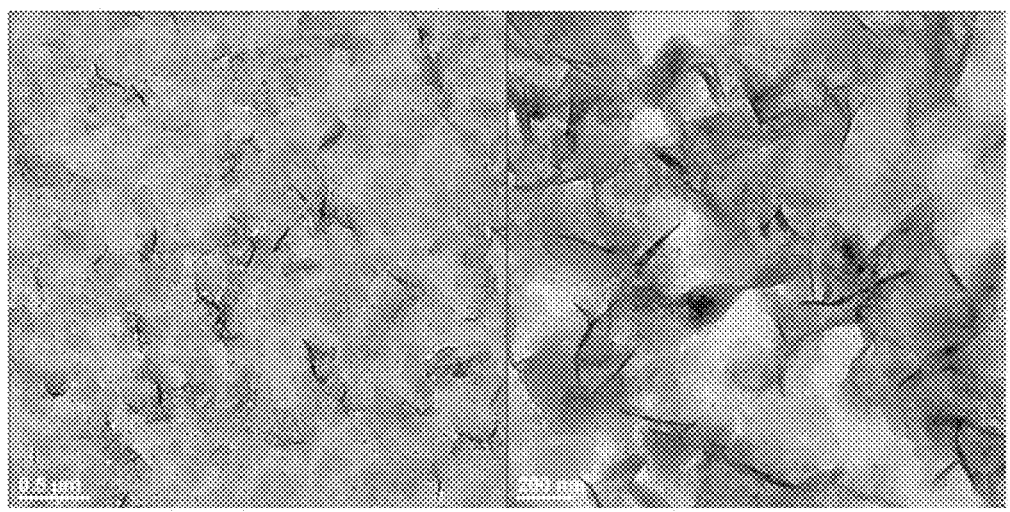
FIG. 9A illustrates representative TEM image of CNC/PAN/$ZnCl_2$ composites before carbonization process showing the well dispersed cellulose nanocrystals or CNC.
Figure 9B:
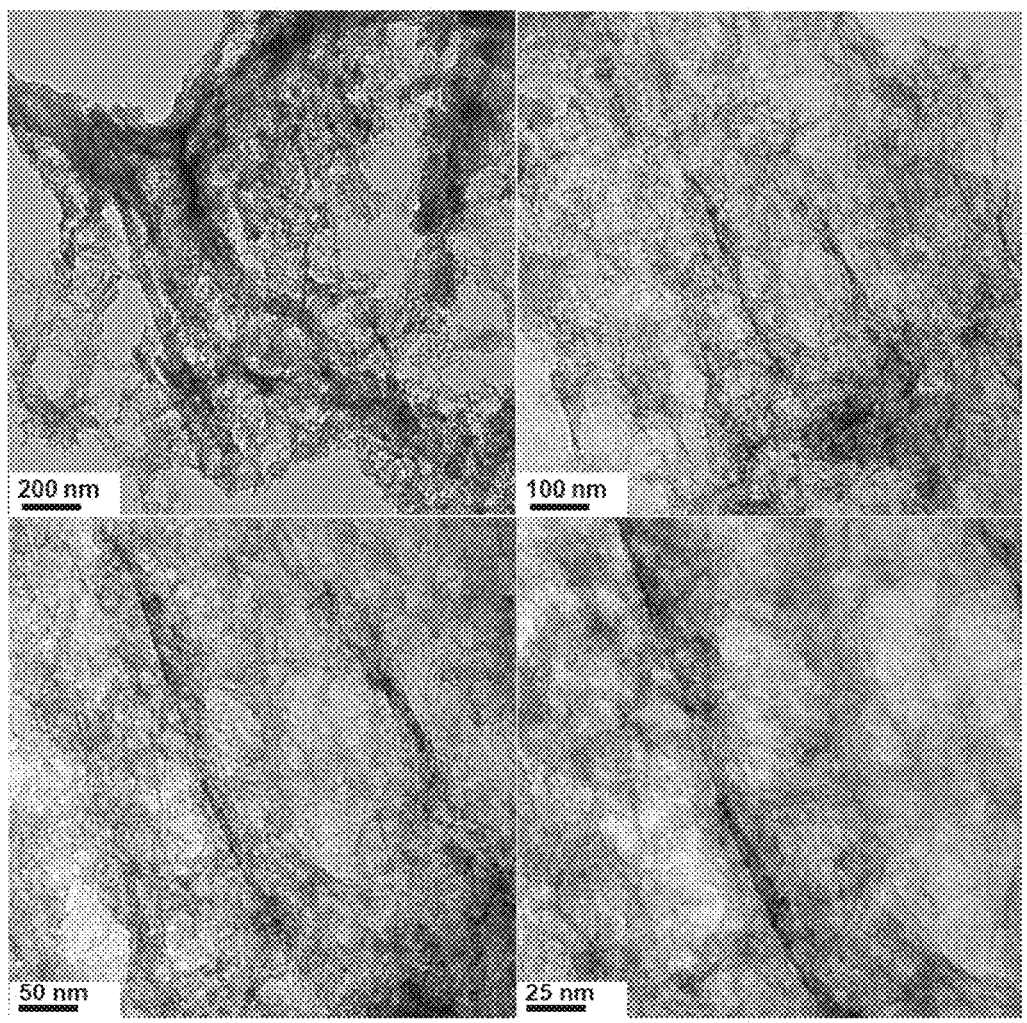
FIG. 9B illustrates representative TEM image of porous carbon templated from cellulose nanocrystals after filtration of PAN/$ZnCl_2$ solution illustrating the existence of porous CNC nanofibers.

EXAMPLE 3. Preparation of N-doped porous carbon from CNC-templated PAN. In a typical synthesis, a certain amount of CNC was added to 10 mL of an aqueous ZnCl$_2$/PAN solution. The concentration of ZnCl$_2$ in the aqueous solution was adjusted to 60 wt % to ensure complete solubility of the PAN. The mixture was stirred overnight at room temperature and then, the CNC/PAN dispersion was subjected to freeze-drying to yield a solid CNC/PAN composite. The composite was then stabilized under air at 280° C. followed by carbonization at 800° C. for 30 min under nitrogen to yield porous carbon. For comparison, the pristine CNC and CNC filtered from aqueous ZnCl$_2$ solution were also carbonized according to the above process. Images of the porous carbons formed by this procedure are shown in FIGS. 9A and 9B. Images shown in FIG. 9A indicated that before conducting the carbonization process, the cellulose nanocrystals were dispersed uniformly within the PAN matrix. The images in FIG. 9B show the nanostructure of porous carbon templated from cellulose nanocrystals after filtration of PAN/ZnCl$_2$ solution. During the pyrolysis process, PAN was activated by ZnCl$_2$ to generate highly porous structure. Cellulose nanocrystals were also infiltrated by ZnCl$_2$ and promoted the formation of porous nanofiber. This was confirmed by the morphology changes of nanofibers after the carbonization process when comparing FIG. 9A and FIG. 9B.

Figure 10A:
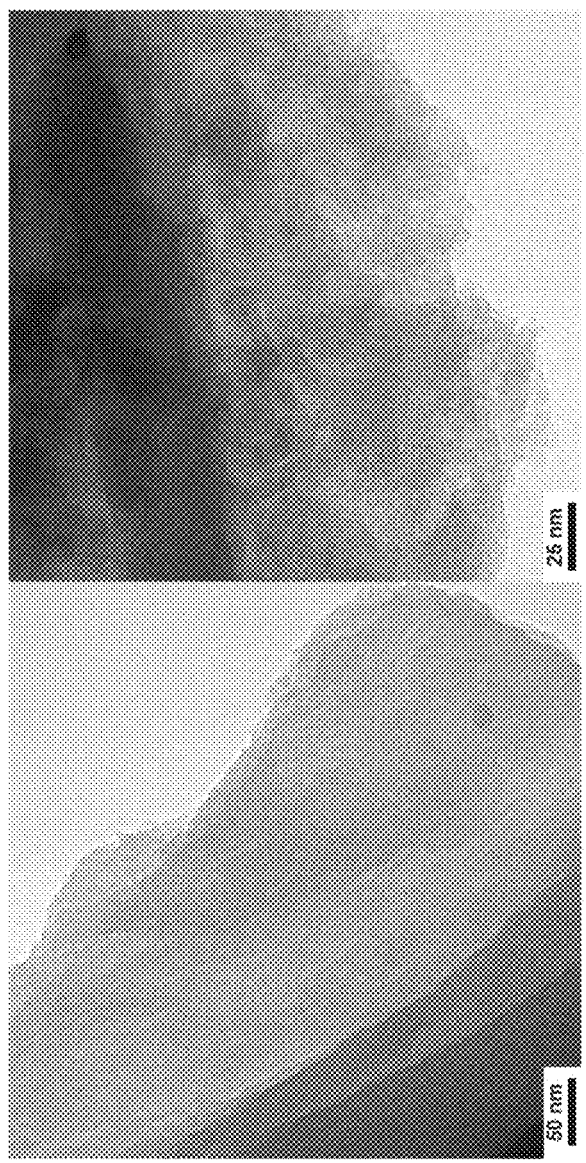
FIG. 10A illustrates representative TEM image of porous carbon templated from pristine filter paper without filtration of PAN/$ZnCl_2$ solution.
Figure 10B:
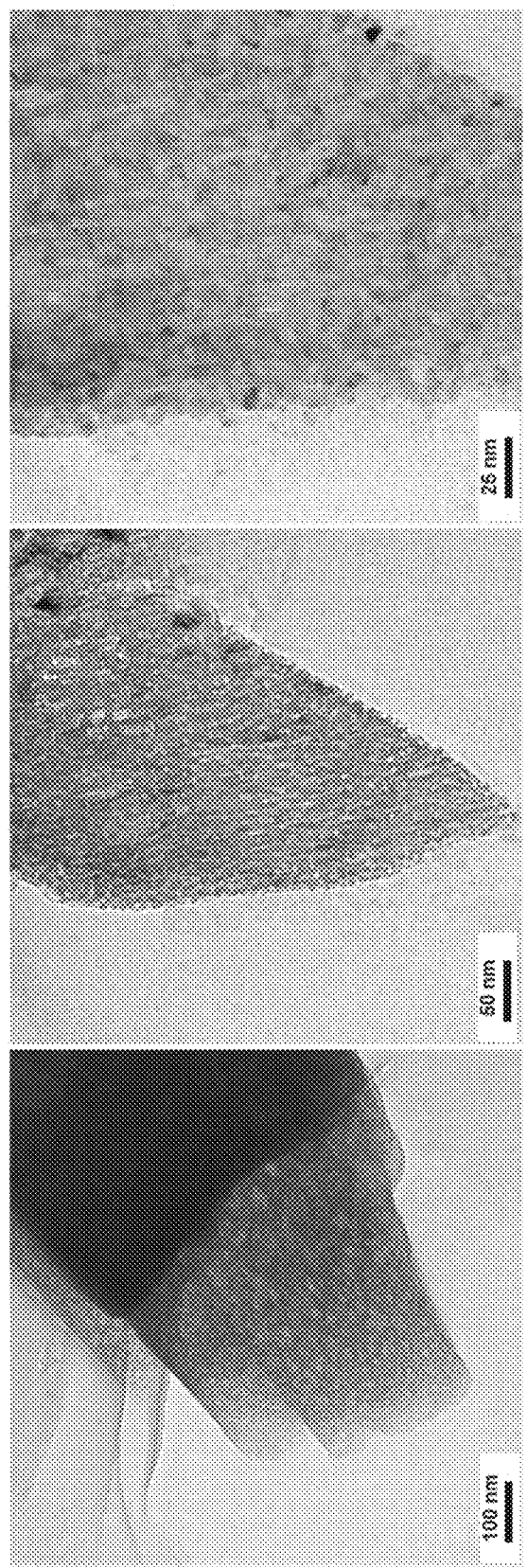
FIG. 10B illustrates representative TEM image of porous carbons templated from filter paper after infiltration of $ZnCl_2$ solution showing the existence of porous fibers.

EXAMPLE 4. Preparation of N-doped mesoporous carbon from filter paper-templated PAN. In a typical synthesis, 10 mL of an aqueous ZnCl$_2$/PAN (6 g/1.0 g) solution was added dropwise onto three pieces of filter paper (3.2 g). The concentration of $ZnCl_2$ in the aqueous solution was adjusted to 60 wt % to ensure complete solubility of the PAN. The $ZnCl_2$/PAN filter paper composites were dried under vacuum at 45° C. The composite was then stabilized under air at 280° C. followed by carbonization at 800° C. for 30 min under nitrogen to yield porous carbon film. For comparison, the pristine filter paper and filter paper filtered from aqueous $ZnCl_2$ solution were also carbonized according to the above process. The $ZnCl_2$ penetration and further activation of filter paper generated porous carbon film with much higher surface areas. FIG. 10A shows the representative TEM image of porous carbon templated from pristine filter paper without filtration of PAN/$ZnCl_2$ solution. With infiltration of $ZnCl_2$ solution, the typical TEM images of porous carbon templated from filter paper are shown in FIG. 10B. When comparing the TEM images with FIG. 10A, the formation of porous structure can be clearly observed in FIG. 10B.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A method for preparation of mesoporous nitrogen-doped carbon comprising forming a composition by solubilizing a nitrogen-containing polymer in an aqueous solution of $ZnCl_2$ and drying the aqueous solution, the method further comprising heating the composition after drying to a temperature to carbonize the nitrogen-containing polymer to form the mesoporous nitrogen-doped carbon.

2. The method of claim 1 further comprising dispersing a plurality of porogenic fillers in the aqueous solution of the composition prior to drying the composition.

3. The method of claim 2 wherein the porogenic fillers comprise at least one of silica particles, cellulose-based nanocrystals or filter paper.

4. The method of claim 2 wherein the composition is cast into a desired form before heating.

5. The method of claim 2 wherein drying comprises freeze-drying.

6. The method of claim 2 wherein the nitrogen-containing polymer is polyacrylonitrile.

7. The method of claim 6 wherein the composition is stabilized by heating at a temperature below 300° C. after drying and before heating the composition to carbonize the nitrogen-containing polymer, wherein the temperature to carbonize the nitrogen-containing polymer is less than 850° C.

8. The method of claim 6 wherein the degree of polymerization of the polyacrylonitrile is 100 or less.

9. The method of claim 6 wherein the degree of polymerization of the polyacrylonitrile is 50 or less.

10. The method of claim 6 wherein the dispersity of the polyacrylonitrile is less than 2.0.

11. The method of claim 6 wherein the dispersity of the polyacrylonitrile is less than 1.5.

12. The method of claim 6 wherein the dispersity of the polyacrylonitrile is less than 1.3.

13. The method of claim 6 wherein the mesoporous nitrogen-doped carbon comprises interconnected pores.

14. The method of claim 6 wherein the mesoporous nitrogen-doped carbon has a surface area greater than or equal to 750 $m^2$/g.

15. The method of claim 6 wherein the mesoporous nitrogen-doped carbon has a surface area greater than or equal to 1,000 $m^2$/g.

16. The method of claim 14 wherein a percentage of the surface area arising from mesopores is at least 84%.

17. The method of claim 6 wherein the mesoporous nitrogen-doped carbon comprise both graphitic and disordered carbons.

18. The method of claim 17 wherein the graphitic carbons comprise catalytically active edge on pyridine oxide-N, pyrrolic- or pyridonic-N, and pyridinic-N(N—P) nitrogens.

19. The method of claim 6 wherein the ratio of fillers to PAN is selected to provide sufficient PAN to fill the majority of the interstitial volume between the fillers, thereby forming a coherent structure.

* * * * *